US010971021B2

(12) United States Patent
Shorter, Jr. et al.

(10) Patent No.: US 10,971,021 B2
(45) Date of Patent: Apr. 6, 2021

(54) COMPREHENSIVE FLIGHT PLANNING TOOL FOR A MOBILE DEVICE

(71) Applicant: Aircraft Owners and Pilots Association, Frederick, MD (US)

(72) Inventors: Douglas Nolen Shorter, Jr., Leesburg, VA (US); John Dennis Hamilton, Frederick, MD (US); Kimberly Lynn Ocasek, Summerville, SC (US); Eric John Rush, Carlisle, PA (US); Brian Michael Tenberg, Manchester, MD (US); John Vance Whitehouse, Walkersville, MD (US); Sergey Krilov, Frederick, MD (US)

(73) Assignee: AIRCRAFT OWNERS AND PILOTS ASSOCIATION, Frederick, MD (US)

( * ) Notice: Subject to any disclaimer, the term of this patent is extended or adjusted under 35 U.S.C. 154(b) by 0 days.

(21) Appl. No.: 16/918,451

(22) Filed: Jul. 1, 2020

(65) Prior Publication Data
US 2020/0334991 A1 Oct. 22, 2020

Related U.S. Application Data

(63) Continuation of application No. 16/050,145, filed on Jul. 31, 2018, now Pat. No. 10,741,085, which is a
(Continued)

(51) Int. Cl.
*G01C 21/00* (2006.01)
*G08G 5/00* (2006.01)
(Continued)

(52) U.S. Cl.
CPC ............ *G08G 5/0034* (2013.01); *G06F 3/00* (2013.01); *G06F 3/048* (2013.01); *G06F 9/451* (2018.02);
(Continued)

(58) Field of Classification Search
CPC .. G08G 5/0034; G08G 5/0013; G08G 5/0026; G08G 5/0043; G08G 5/0091;
(Continued)

(56) References Cited

U.S. PATENT DOCUMENTS 5,566,073 A   10/1996  Margolin
5,874,905 A    2/1999  Nanba et al.
(Continued)

FOREIGN PATENT DOCUMENTS

WO         WO 01/27822 A1    4/2001

OTHER PUBLICATIONS

David Crossley et al., A Generic Map Interface to Query Geographic Information Using the World Wide Web, http://www.w3.org/Conferences/WWW4/Papers/australia/#15, Apr. 10, 2001.

*Primary Examiner* — Adam M Alharbi
(74) *Attorney, Agent, or Firm* — Finnegan, Henderson, Farabow, Garrett & Dunner, LLP

(57) ABSTRACT

A flight planning system for providing a flight planning tool on a client device includes a flight planning module, a weather module, and an airport module. A flight planning API is configured to communicate with the modules and client device, and receive, via client device hardware, a request for information associated with a selection of one of a plurality of tools corresponding to one of the modules. Accessing the flight planning system includes identifying a user and authorizing access to the flight planning system. The flight planning module is configured to: retrieve, based on the tool selection, information responsive to the request from at least one of a third-party device or another of the plurality of modules; generate an aviation flight plan based on the information responsive to the request; and transmit the flight plan to the client device for display via the client device.

20 Claims, 19 Drawing Sheets

Related U.S. Application Data continuation of application No. 14/929,194, filed on Oct. 30, 2015, now Pat. No. 10,068,487.

(60) Provisional application No. 62/107,071, filed on Jan. 23, 2015, provisional application No. 62/073,425, filed on Oct. 31, 2014, provisional application No. 62/137,327, filed on Mar. 24, 2015.

(51) Int. Cl.
*G06Q 10/10* (2012.01)
*G06F 3/048* (2013.01)
*G06F 3/00* (2006.01)
*G06F 9/451* (2018.01)

(52) U.S. Cl.
CPC ........... *G06Q 10/10* (2013.01); *G06Q 10/109* (2013.01); *G08G 5/0013* (2013.01); *G08G 5/0026* (2013.01); *G08G 5/0043* (2013.01); *G08G 5/0091* (2013.01)

(58) Field of Classification Search
CPC ............ G06F 9/451; G06F 3/00; G06F 3/048; G06Q 10/10; G06Q 10/109
See application file for complete search history.

(56) References Cited

U.S. PATENT DOCUMENTS

| | | |
|---|---|---|
| 5,944,769 A | 8/1999 | Musk et al. |
| 6,005,581 A | 12/1999 | Gjullin |
| 6,112,141 A | 8/2000 | Briffe et al. |
| 6,134,500 A | 10/2000 | Tang et al. |
| 6,240,341 B1 | 5/2001 | Snyder |
| 6,353,794 B1 | 5/2002 | Davis et al. |
| 6,388,688 B1 | 5/2002 | Schileru-Key |
| 6,459,986 B1 | 10/2002 | Boyce et al. |
| 6,675,092 B1 | 1/2004 | Katayama et al. |
| 7,263,494 B1 | 8/2007 | Harris |
| 7,555,725 B2 | 6/2009 | Abramson et al. |
| 7,623,494 B2 | 11/2009 | Zhu et al. |
| 7,640,098 B2 | 12/2009 | Stenbock et al. |
| 8,447,512 B2 | 5/2013 | Stenbock et al. |
| 9,511,877 B2 | 12/2016 | Masson |
| 9,810,770 B1 | 11/2017 | Weichbrod |
| 9,849,999 B1 | 12/2017 | Fymat |
| 2001/0027375 A1 | 10/2001 | Machida et al. |
| 2002/0059296 A1 | 5/2002 | Hayashi et al. |
| 2010/0152962 A1 | 6/2010 | Bennett et al. |
| 2011/0313597 A1 | 12/2011 | Wilson et al. |
| 2012/0010765 A1 | 1/2012 | Wilson et al. |
| 2012/0218127 A1* | 8/2012 | Kroen .................... G08G 5/006 340/945 |
| 2012/0259669 A1 | 10/2012 | Stilwell et al. |
| 2013/0013133 A1 | 1/2013 | Walter |
| 2013/0265425 A1 | 10/2013 | Smailus |
| 2015/0066342 A1* | 3/2015 | Garzella .......... G06Q 10/06311 701/120 |
| 2015/0169191 A1 | 6/2015 | Maji |
| 2015/0199906 A1 | 7/2015 | Judy |
| 2016/0111007 A1 | 4/2016 | Dennerline |
| 2016/0180715 A1 | 6/2016 | Burke et al. |
| 2016/0225264 A1 | 8/2016 | Taveira |
| 2018/0096612 A1* | 4/2018 | Alphonso ............. G08G 5/065 |

* cited by examiner

Surface
Asphalt, grooved, in good condition, right pattern

Traffic Pattern
ILS, LOC, VOR, RNAV, GPS, 3° GS

Approach Lighting
4-Light/Left-Side PAPI

23

Surface
Asphalt, grooved, in good condition, left pattern

Traffic Pattern
ILS, LOC, VOR, RNAV, GPS, 3° GS

Approach Lighting
4-Light/Left-Side PAPI

12/30
3600' x 75'

Weather Images

Countries

United States

Mexico

Oceans

Western Atlantic Ocean

Eastern Pacific Ocean

Regions

Northwest US

North Central US

Northeast US

*Fig. 14*

CONFIRM FAA FLIGHT PLAN

| | |
|---|---|
| Type | IFR |
| FAA Designation | C172 |
| Equipment | G - GPS, transpon |
| Altitude | 4500 |
| Airspeed | 115 |
| Route | |
| Departure Date | 12/18/2014 |

*Fig. 19*

COMPREHENSIVE FLIGHT PLANNING TOOL FOR A MOBILE DEVICE

PRIORITY CLAIM

This application is a continuation of U.S. Non-provisional application Ser. No. 16/050,145, filed on Jul. 31, 2018, which is a continuation of U.S. Non-provisional application Ser. No. 14/929,194, filed Oct. 30, 2015, and claims priority under 35 U.S.C. § 119 to U.S. Provisional Application No. 62/107,071, filed on Jan. 23, 2015, U.S. Provisional Application No. 62/137,327, filed on Mar. 24, 2015, and U.S. Provisional Application No. 62/073,425, filed on Oct. 31, 2014. The foregoing provisional and non-provisional applications are hereby incorporated by reference in their entireties.

TECHNICAL FIELD

The disclosed embodiments generally relate to a flight planning tool that assists general aviation pilots, and more particularly, a comprehensive flight planning tool provided on a mobile device that assists general aviation pilots with planning and executing a general aviation flight.

BACKGROUND

Modern flight planning has continued to evolve from early individual web-based applications that separately supplied a general aviation pilot with flight information, such as weather, aircraft performance information, airport directories, and fundamental route planning to more all-in-one-solutions. For example, mobile, in-cockpit Electronic Flight Bags (EFBs) provide some information relevant to a flight, such as real-time weather and traffic information via wireless access to remote devices. But while current systems like EFBs may provide mobile access to some available information, there is a need for a single, customized source for all critical and pertinent information necessary for a pilot to plan and execute a flight, as well as to integrate the information across other available platforms. Further, there is a need for information to be readily available to a pilot before, during, and after an aviation flight.

In addition, the prevalence of devices that use mobile applications (e.g., smartphones, tablets, etc.) provides an avenue for a comprehensive flight planning tool to be provided in manner that allows the information to be readily accessible to a user, even in an on-the-go situation. Thus, there is a need for a mobile application that provides the above advantages.

SUMMARY

The disclosed embodiments include a device that is configured to provide a flight tool mobile application and methods for the device to execute the flight tool mobile application.

In one aspect, a mobile application is disclosed for providing a flight planning tool on a client device. The mobile application may include a data input module configured to receive, via interface hardware on the client device, a selection of one of a plurality of selectable tools. The mobile application may further include a graphics module configured to display, via the interface hardware, a user interface associated with the selection. The mobile application may further include a flight planning communication module configured transmit a request for information associated with the selection, via an API, to a flight planning system, and receive, from the flight planning system via the API, responsive information that fulfills the request, wherein the responsive information was generated by the flight planning system based on information from a third-party device.

In another aspect, a method of planning a flight is disclosed. The method may include receiving, via interface hardware on a client device, a selection of one of plurality of selectable tools, displaying, via the interface hardware, a user interface associated with the selection, and transmitting a request for information associated with the selection, via an API, to a flight planning system. The method may further include receiving, from the flight planning system via the API, responsive information that fulfills the request, wherein the responsive information was generated by the flight planning system based on information from a third-party device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

Figure 11:
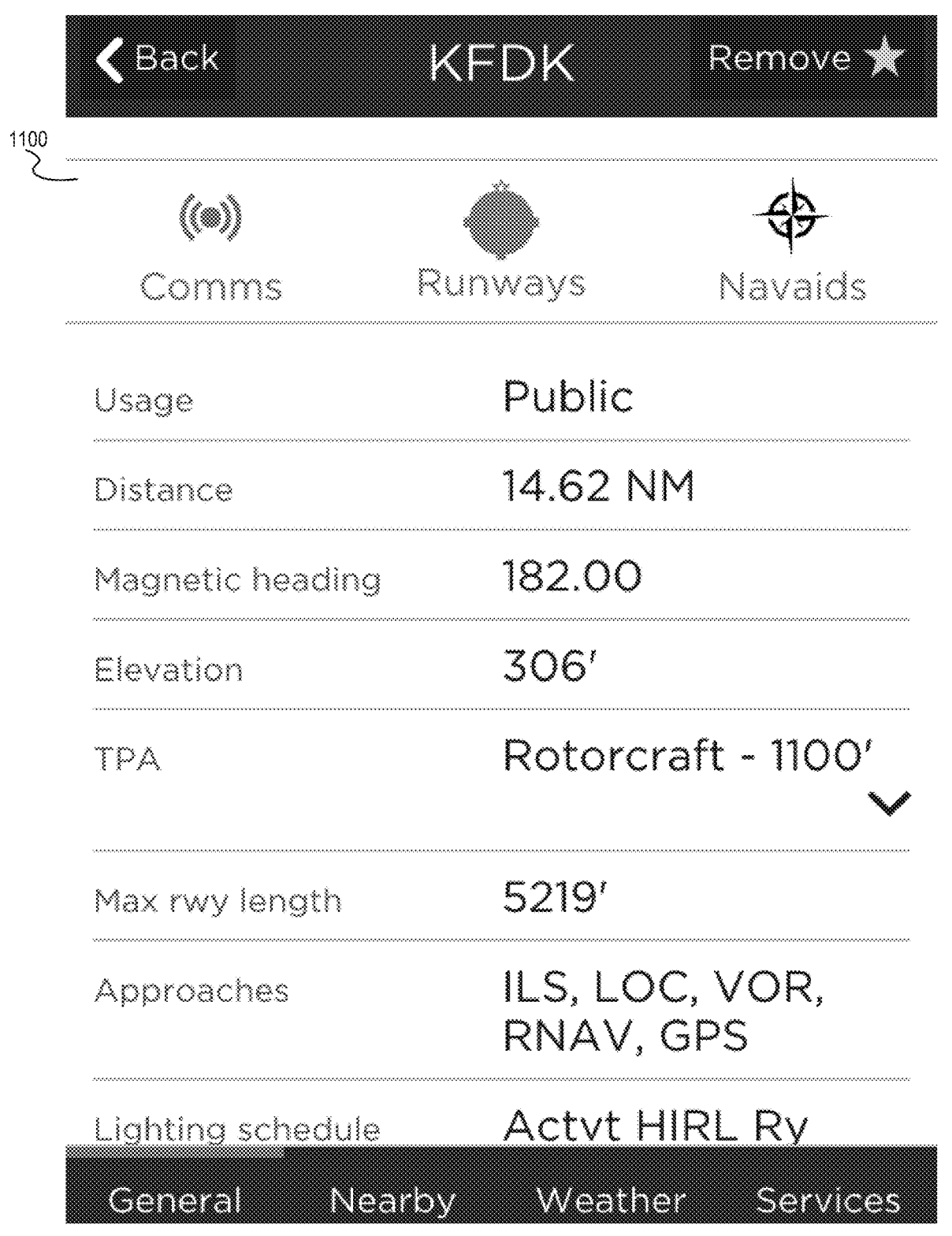

FIG. 11 is an illustration of an exemplary user interface including selectable tools, consistent with disclosed embodiments;

FIG. 14 is an illustration of an exemplary user interface including selectable tools, consistent with disclosed embodiments;

FIG. 19 is an illustration of an exemplary user interface including selectable tools, consistent with disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments pertain to a comprehensive flight planning tool, which may take the form of mobile application. The mobile application may be a single-source online data fusion of all necessary resources for a general aviation pilot to accurately and competently plan a flight in a general aviation aircraft using a mobile application device (e.g., smartphone, tablet, laptop etc.). Further, the form of a mobile application renders the information readily and easily available to a user, including information that is available online (e.g., information readily available via an Internet connection) and information that is available offline (information stored as part of or for use in conjunction with the mobile application).

Figure 1:
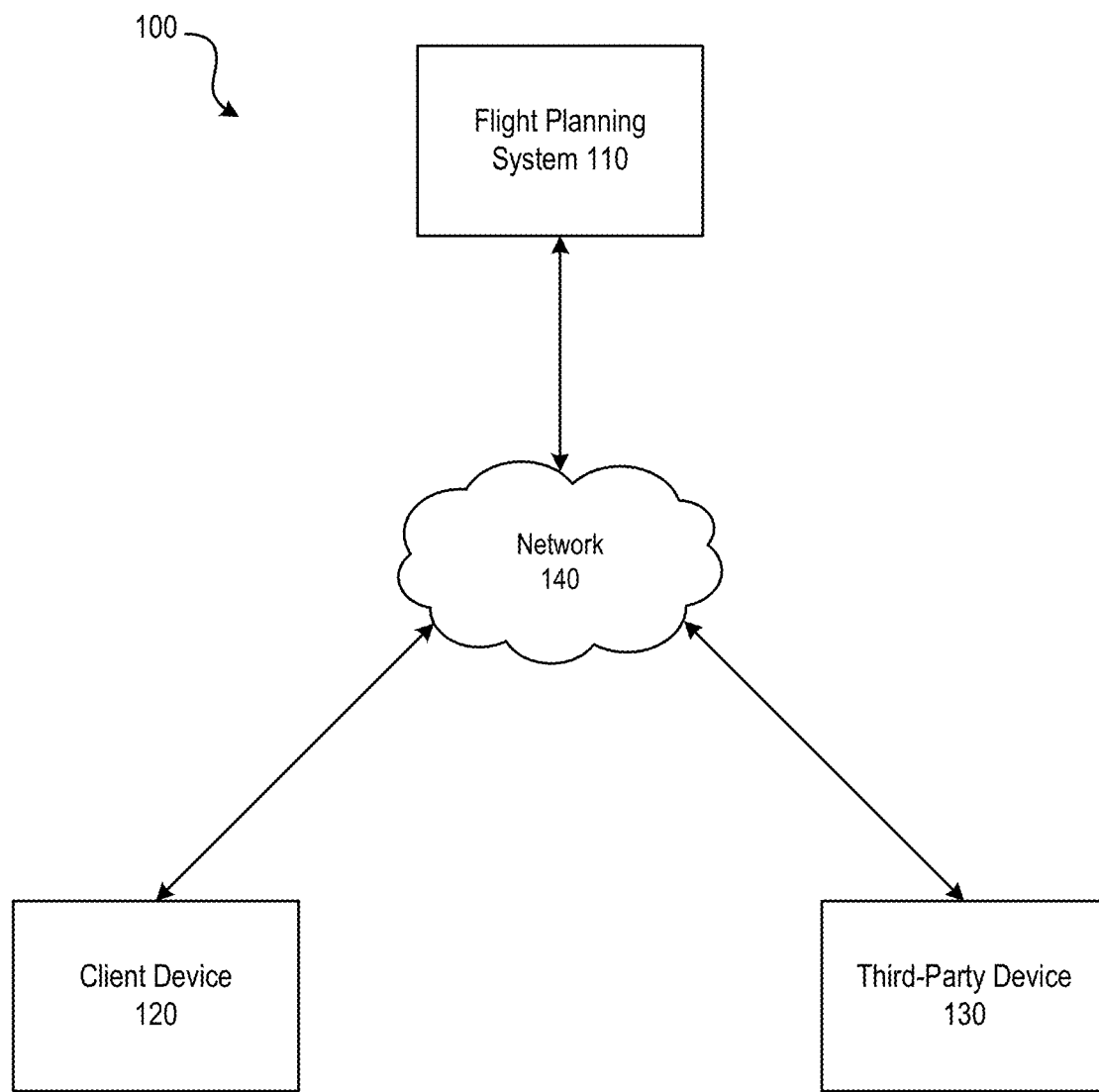
FIG. 1 is a block diagram of an exemplary system consistent with disclosed embodiments.

FIG. 1 is a diagram illustrating an exemplary system 100 for performing one or more operations consistent with the disclosed embodiments. In one embodiment, system 100 may include a flight planning system 110, a client device 120, a third-party device 130, and a network 140. The components and arrangement of the components included in the system 100 may vary. Thus, the system 100 may further include other components that perform or assist in the performance of one or more processes consistent with the disclosed embodiments.

Flight planning system 110 may include one or more computing systems that are configured to execute software instructions stored on one or more memory devices to perform one or more operations consistent with the disclosed embodiments. Flight planning system 110 may include one or more of a server, a computer, an embedded system, or a dedicated hardware device. In certain embodiments, flight planning system 110 may be configured as a particular apparatus, system, and the like based on the storage, execution, and/or implementation of the software instructions that perform one or more operations consistent with the disclosed embodiments.

In an exemplary embodiment, flight planning system 110 may include hardware and/or software components configured to create, store, and transmit a variety of selectable flight planning tools. For example, flight planning system 110 may include hardware devices configured to gather information which may be useful to a pilot or individual associated with aviation. For instance, flight planning system 110 may include (or be configured to communicate with) devices that include weather data, airport data, aircraft data, pilot data, etc. Flight planning system 110 may collect this information and perform one or more processes to make it available to a user. For example, flight planning system 110 may be configured to provide the information to client device 120 and/or third party device 130.

Client device 120 may be one or more computing systems that are configured to execute software instructions for performing one or more operations consistent with the disclosed embodiments. In some embodiments, client device 120 may be one or more of a mobile device (e.g., a tablet, smartphone, laptop, etc.), a desktop computer, a server, an embedded system, a dedicated hardware device, etc. Client device 120 may include one or more processors configured to execute software instructions stored in memory, such as memory included in client device 120. Client device 120 may include software that, when executed by a processor, performs known network-related communication and content display processes. For instance, client device 120 may execute browser software that generates and displays interface screens including content on interface hardware (e.g., a display device) included in, or connected to, client device 120.

In one embodiment, client device 120 may be a laptop or desktop computer configured to communicate with flight planning system 110 (e.g., via network 140). Client device 120 may be configured to execute software instructions to display an online flight planner generated by flight planning system 110. In one embodiment, the online flight planner may be a web-based application (e.g., website, applications, widget, etc.) through which client device 120 may provide information to a user (e.g., information collected by flight planning system 110) and request information from flight planning system 110 (e.g., generation of a flight plan).

In another embodiment, client device 120 may be a tablet or smartphone configured to store and/or execute one or more mobile applications ("apps"). For example, client device 120 may be configured to run a flight planning app, which may make flight planning system 110 accessible to a user (e.g., receive requests based on user input, display information received from flight planning system 10, etc.).

Third-party device 130 may be one or more computing systems associated with a third-party. Third-party device 130 may include one or more computing systems that are configured to execute software instructions for performing one or more operations consistent with the disclosed embodiments. For example, third-party device 130 may be as a server, computer, laptop, mobile device (e.g., tablet, smartphone, etc.), and embedded system, a dedicated hardware device, etc. While one third-party device 130 is shown in FIG. 1, it should be understood that system 100 may include a plurality of third-party devices 130, each associated with the same or different third-parties.

In one aspect, third-party device 130 may be associated with a third-party that determines, collects, and/or stores information related to aviation. For example, third-party device 130 may be associated with a weather forecaster, an aircraft manufacturer, an airport, an aircraft, an aviation regulatory entity (e.g., FAA and the like), etc., and generate periodic or real-time information, including pilot information, aircraft information, travel routes, custom waypoints, weather briefs, light plans, bulletins, and/or other information. In this way, flight planning system 110 may receive real-time information through communication with a selected third-party device 130.

Other information generated by third party device 130 may include real-time alerts and/or flight restrictions. For example, third party device 130 may generate weather alerts associated with particular regions, airports, or flight paths as weather patterns change. Third party device 130 may also generate alerts communicating critical flight information, such as temporary flight restrictions (TFR), notices to airmen (NOTAM), closed airport notices, etc. Such information may be official (published) notices from an authoritative entity (e.g., FAA) or non-official notices (e.g., stadium TFRs).

In another aspect, third-party device 130 may be associated with a third-party that provides information to a user through client device 120. For example, third-party device 130 may be associated with an entity that provides an aviation tool (e.g., a mobile app) that may be accessed by client device 120. In some embodiments, flight planning system 110 may communicate with third-party device 130 to integrate information and resources to enhance the aviation tool provided by the third-party.

In another aspect, third-party device 130 may include installed cockpit navigation equipment, wireless cockpit equipment, and/or other flight tools. Such third-party devices 130 may include wired or wireless communication interfaces configured to permit communication with client device and flight planning system via network 140. Information generated by such third-party devices may include flight routes, air traffic, weather information, and/or other information useful or planning flight maneuvers.

Network 140 may be any type of network (e.g., a communication network) configured to provide communications between components of system 100. For example, network 140 may be any type of network (including infrastructure) that provides communications, exchanges information, and/or facilitates the exchange of information, such as the Internet, a Local Area Network, Near Field Communication (NFC), WiFi, Bluetooth®, or other suitable connection(s) that enables the sending and receiving of information between the components of system 100. In other embodiments, one or more components of system 100 may communicate directly through a dedicated communication link(s) (not shown), such as a link between flight planning system 110 and client device 120.

Figure 2:
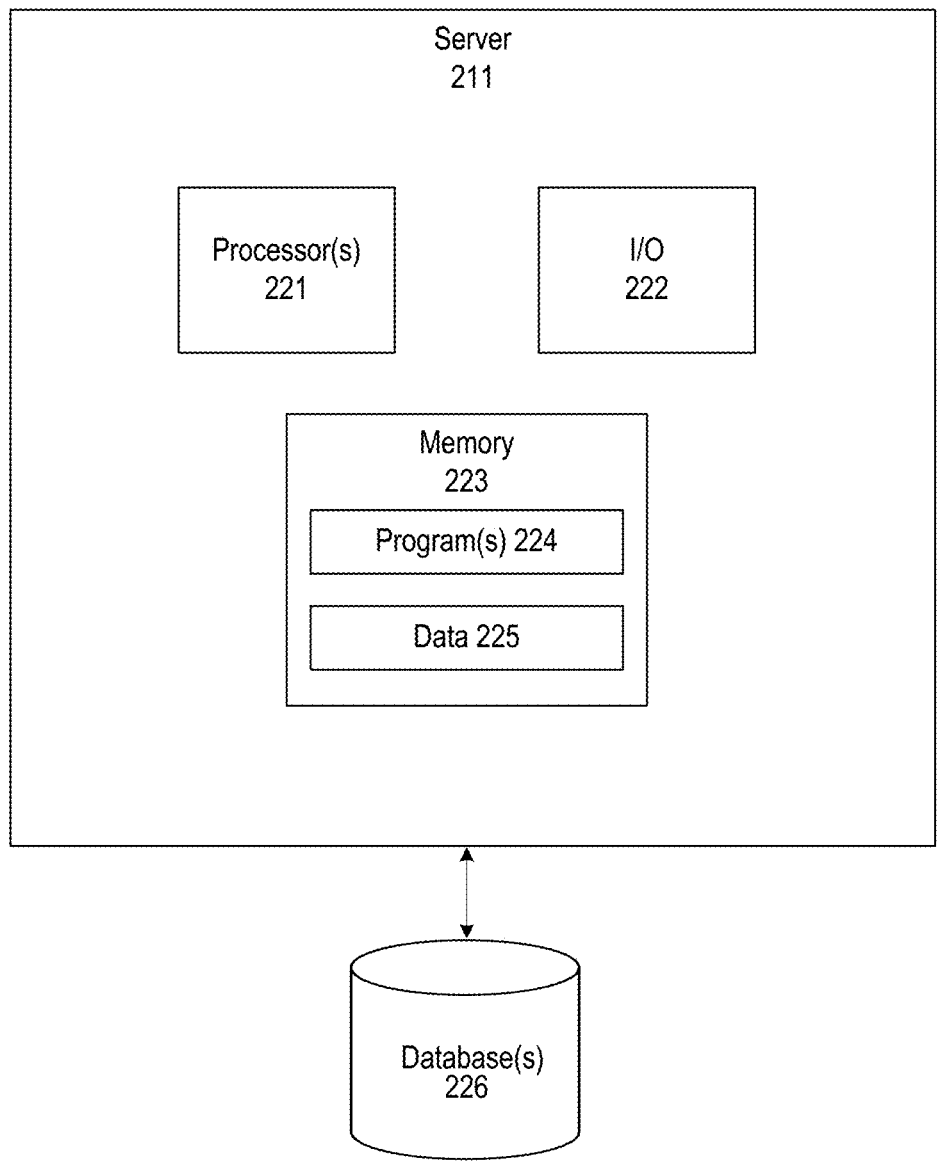
FIG. 2 is a block diagram of an exemplary server, consistent with disclosed embodiments.

FIG. 2 shows an exemplary server 211 for implementing embodiments consistent with the present disclosure. In an exemplary embodiment, server 211 may correspond to flight planning system 110. It should be understood, however, that variations of server 211 may correspond to client device 120, third-party device 130, and/or components thereof.

In one embodiment, server 211 may include one or more processors 221, one or more memories 223, and one or more input/output (I/O) devices 222. According to some embodiments, server 211 may be an embedded system or similar computing device(s) that generate, maintain, and provide web site(s) and/or mobile applications consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN.

Processor 221 may include one or more known processing devices, such as a microprocessor from the Pentium™ or Xeon™ family manufactured by Intel™, the Turion™ family manufactured by AMD™ or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, flight planning system 110, client device 120, and/or third-party device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include MS SQL, Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226.

Figure 3:
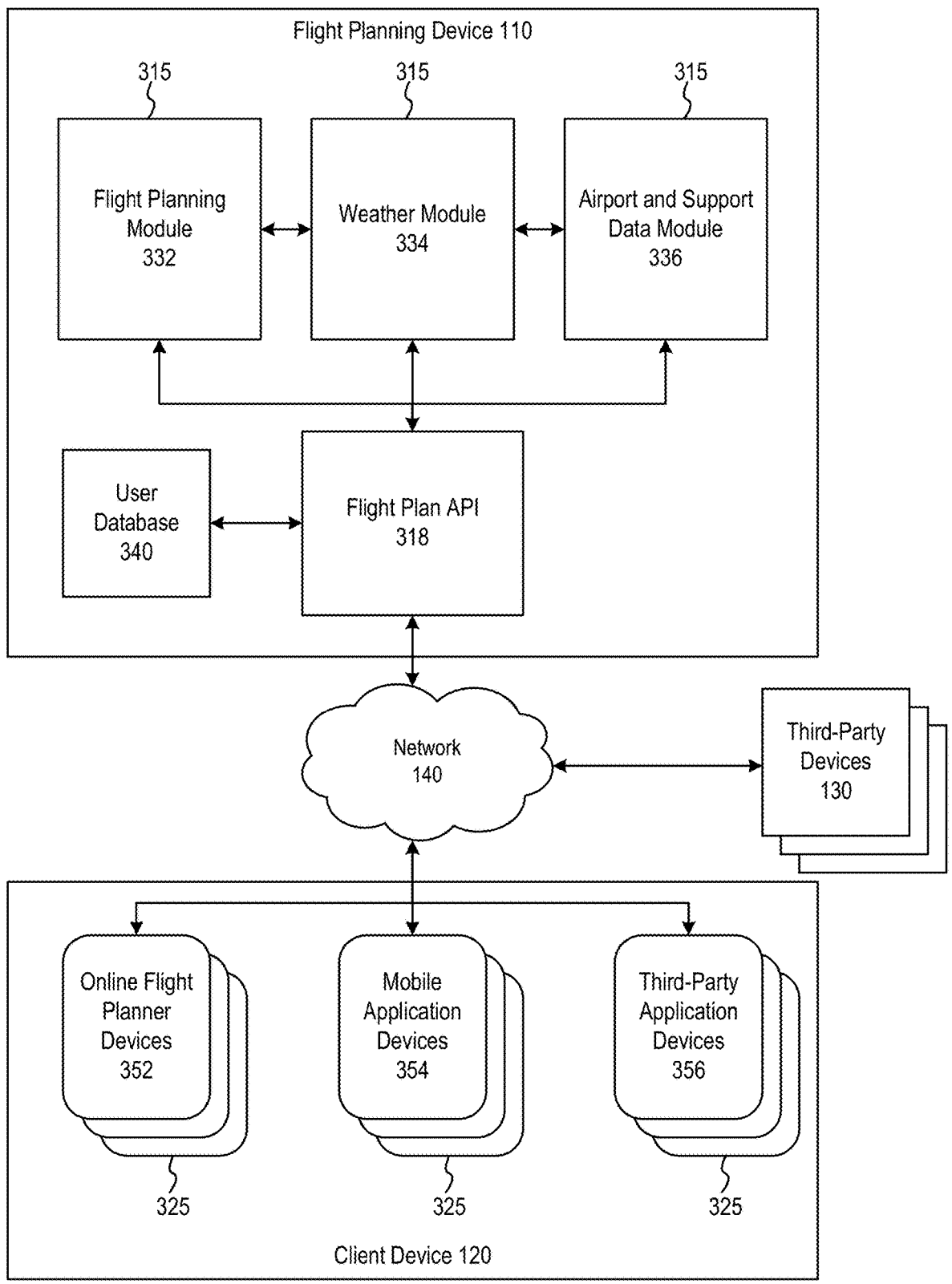
FIG. 3 is a block diagram of another exemplary system, consistent with disclosed embodiments.

FIG. 3 is a diagram illustrating an exemplary configuration of the components of system 100, including various additional components and features thereof. It should be understood that the configuration of system 100 depicted in FIG. 3 is exemplary, and that other configurations, including additional and/or alternative components and features are possible.

In an exemplary embodiment, flight planning system 110 may include features configured to generate a flight plan and/or provide the flight plan and/or aviation-related information to client device 120. For example, flight planning system 110 may include a plurality of modules 315 and a flight plan API 318 (application programming interface). Modules 315 may serve as data sources, configured to collect and store information, as well as to generate and store additional information and/or customized tools. Flight plan API 318 may be an exemplary interface through which flight planning system 110 may communicate with client device 120 and third-party device 130. That is, flight plan API 318 may be configured to allow flight planning system 110 to communicate with client device 120 and/or third-party device 130 over network 140. While flight plan API 318 is depicted and described as one interface, it should be understood that flight plan API 318 my include a plurality of interfaces, such as an internal flight plan API for communicating with client device 120 (e.g., through a website or mobile application associated with flight planning system 110) and an external flight plan API for communicating with client device 120 (e.g., through a third-party website or mobile application) and/or third-party device 130.

API 318 includes a REST-based (representational state transfer) architecture or another type of architecture, if desired. API 318 may be configured to communicate various types of information, such as flight plant, pilot information, aircraft information, user-defined waypoints, user generated content, etc. API 318 may be device-agnostic. That is, API 318 may be configured to communicate successfully with devices having various operating platforms and/or communication protocols. API 318 may include encryption protocols, such as Secure Sockets Layer (SSL), to provide for secure data transmissions.

As shown in FIG. 3, client device 120 may include or embody one or more of a plurality of client devices 325. Client devices 325 may include devices operated by users. The users may operate client devices 325 to cause client devices 325 to communicate with flight planning system 110 via flight plan API 318 and/or third-party device 130 (e.g., through network 140). Client devices 325 may receive information from flight planning system 110 and/or third-party device 130 and display it with associated interface hardware. Further client devices 325 may be configured to receive user input, and provide the user input information to flight planning system 110 and/or third-party device 130, such as to cause those devices to provide certain information back to client devices 325.

Third-party device 130 may be connected to network 140 such that third-party device 130 may communicate with flight plan API 318 and/or client devices 325. As shown in FIG. 3, third-party device 130 may include a plurality of third-party devices 130, which each may be associated with a different third-party entity, as described above.

In an exemplary embodiment, modules 315 may include at least a flight planning module 332, a weather module 334, and an airport and support data module 336. For the purposes of this disclosure, "modules" (also known as "engines") may be implemented in software, hardware, firmware, a mix of any of those, or the like. For example, if the disclosed "modules" are implemented in software, they may be stored in a memory associated with flight planning system 110. Processors, I/O devices, and memory devices may be utilized to perform processes to implement and facilitate operations of modules 315. Thus, modules 315 may include code instructions executable by one or more processors, alone or in various combinations with other modules disclosed in this or other embodiments. For example, flight planning module 332 may be configured to interact with weather module 334, and/or other modules of flight planning system 110, shown or not shown in FIG. 3, to perform functions consistent with disclosed embodiments. In other embodiments, if the disclosed "modules" are implemented in hardware, they may comprise an embedded system or other dedicated hardware configured by machine code, assembly code, or the like to interact with other modules of flight planning system 110 to perform functions consistent with disclosed embodiments.

Flight planning module 332 may be configured to generate a flight plan. Flight plans may include information such as, but not limited to, departure and arrival information (e.g., date, time, location, etc.), estimated time of travel, alternate airports in case of bad weather, type of flight (e.g., IFR, VFR), pilot's information, number of people on board, information about the aircraft, flight route, altitude, etc. Flight routes may be geographic paths between departure and arrival locations, and may include any waypoint in between. Flight planning module 332 may be configured to execute software instructions to determine a route for a potential aviation flight. Flight planning module 332 may communicate with other modules 315 to collect information that may be used to calculate a flight route. Flight planning module 332 may also communicate with third-party devices 130 (e.g., via flight plan API 318) to collect information. Flight planning module 332 may provide a generated flight plan to client device 110 for display and use by a user.

In some embodiments flight planning module 332 may include various features configured to provide an interactive flight plan. For example, flight planning module 332 may include a flight planning engine, a routing engine, and a graphics engine. The routing engine may determine a route for the flight and the graphics engine may generate interactive charts and weather displays. The flight planning engine may combine the route and graphics to generate an interactive flight plan for a user.

Weather module 334 may be configured to track and store information related to weather that may affect aviation, such as by providing access to a collection of real-time, forecasted and predictive weather products. For example, weather module 334 may generate forecasts and predictions based on collected weather data or may receive completed forecasts and predictions. Weather module 334 may receive data and/or forecasts from third-party devices 130 (e.g., via flight plan API 318). For example, weather module 334 may access a weather forecast system such as Aircraft Owners and Pilots Association (AOPA) Weather or third-party providers. Weather module 334 may be configured to provide weather information to flight planning module 332 for use in generating a flight plan. Forecasts may include past forecasts, current forecasts (i.e., anticipated future weather conditions), current weather conditions, and/or predictive forecasts.

Airport and support data module 336 may be an additional module or modules configured to collect, generate, and/or store additional information that may be pertinent to aviation, such as information that may be used by flight planning module 332 to create a flight plan. For example, airport and support data module 336 may provide information related to airports, aircrafts, airlines, pilots, social media, news, aviation entities (e.g., FAA, AOPA, etc.), and the like. Airport and support data module 336 may connect to third-party devices 130 associated with this information (e.g., via flight plan API 318) to gather and store information that may be used by flight planning module 332 and/or provided to client device 110 and/or a third-party device 130.

Exemplary features of airport and support data module 336 may include flight planning resources such as an airport directory (e.g., through access to a full AOPA airports directory), weight and balance information, temporary flight restrictions, user-generated content, pilot and aircraft logbooks, manuals and instructions, calendars, etc. Further, while depicted and described with respect to airport and support data module 336, it should be understood that other components of flight planning system 110 may additionally, alternatively, and/or work in combination with airport and support data module 336 to provide these features.

In addition to modules 315, flight planning system 110 may include or be connected to at least one database 340. Database 340 may contain relevant pilot, aircraft, and flight planning information that may be used by one or more components of system 100, such as flight planning module 332. Flight plan API 318 may be configured to retrieve information from database 340 for modules 315, client devices 325, and/or third-party devices 130. In an exemplary embodiment, database 340 may be an SQL database, but is not limited thereto.

Client devices 325 may include any client computing device configured to communicate with flight planning system 110 and/or a third party device 130. In an exemplary embodiment, client devices 325 may include online flight planner devices 352, mobile application devices 354, and third-party application devices 356. It should be understood that these representations of client devices 325 are made for convenience of discussion, and that they may overlap (i.e., a mobile application device 354 and a third-party application device 356 may be the same device).

Online flight planner devices 352 may be client devices 352 that are configured to communicate with flight planning system 110 to provide a web-based flight planning tool to a user. For example, online flight planner devices 352 may be laptop, desktop computer, notebook, tablet, smartphone, smartwatch, etc. configured to access a website (or other web-based application) provided by flight planning system 110. The website may provide access to a comprehensive flight planning tool provided by flight planning system 110.

Mobile application devices 354 may be client devices 325 that are configured to execute a mobile flight planning application. The mobile flight planning application may be a similar tool to the website accessible by online flight planner devices 352; however, it may be customized for use by a mobile device, including software that may be stored by mobile application devices 354. The mobile flight planning application may also provide access to a comprehensive flight planning tool provided by flight planning system 110.

Third-party application devices 356 may be client devices 325 that are similar to online-flight planner devices 352 and/or mobile application devices 354. For example, third-party application devices 356 may have web access and/or be configured to execute a mobile application. Regardless, third-party application device 356 may differ in that they connect to a third-party device 130 for receiving information through a website or mobile application. For example, third-party application devices 356 may include client devices 325 that store and execute a social media platform provided by a third-party device 130. In an exemplary embodiment, flight planning system 110 may be configured to communicate with the associated third-party device 130 such that flight planning information may be combined with the third-party application to provide an integrated service to a user through a third-party application device 325.

Figure 4:
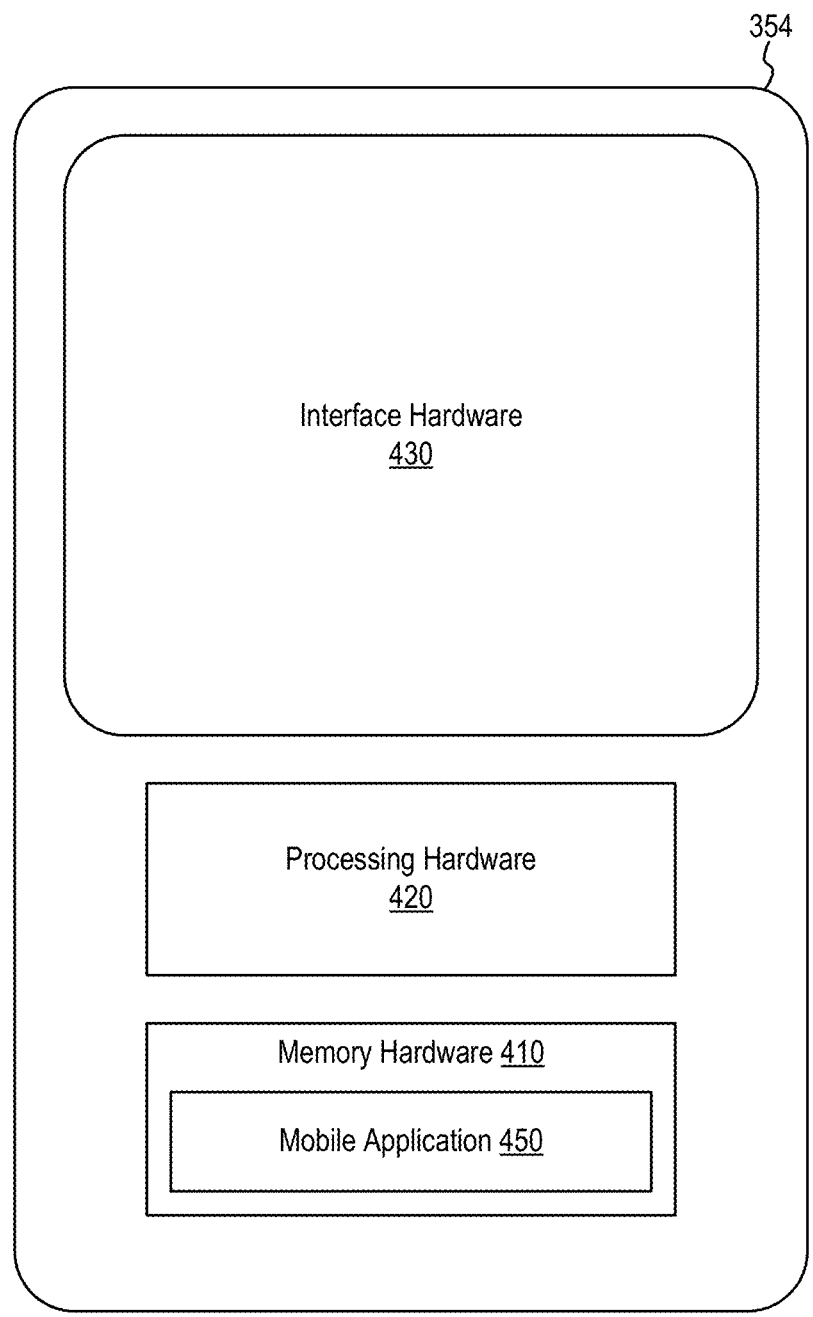
FIG. 4 is a block diagram of an exemplary mobile application device, consistent with disclosed embodiments.

FIG. 4 depicts an exemplary mobile application device 354 in more detail, consistent with disclosed embodiments. Mobile application device 354 may include memory hardware 410, processing hardware 420, and interface hardware 430. Other features of mobile application device 354 may include a location device (e.g., a GPS device) configured to determine a location of mobile application device 354, and may also include a connection device configured to wirelessly connect to network 140 (e.g., a cellular communication device, Wi-Fi Device, Bluetooth® device, etc.). Although FIG. 4 depicts mobile application device 354 for purposes of this description, it is noted that other client devices 325, such as online flight planner devices 352 and third-party application devices 356, may include components described with reference to mobile application device 354, such as memory hardware 410, processing hardware 420, interface hardware 430, and any other hardware or software described with reference to mobile application device 354.

Mobile application device 354 may be configured to execute a mobile application 450 stored in memory hardware 410. For example, mobile application device 354 may be a smartphone or tablet configured to run a mobile operating system (e.g., iOS, Android, etc.) which may be compatible with a variety of mobile applications provided by third-party providers. In an exemplary embodiment, mobile application 450 is a comprehensive flight planning tool. In other words, mobile application device 354 may be configured to provide a comprehensive flight planning tool to a user of mobile application device 354 via mobile application 450.

It is noted that mobile application 450 is not limited to use with mobile application device 354. Mobile application 450 may be used with other client devices, such as online flight planner devices 352, third-party application devices 356, and/or other client devices 325. Mobile application 450 may be appropriately configured for used with online flight planner devices 352, mobile application devices 354, third-party application devices 356, or any other client device 325. For example, mobile application 450 may be configured to be used in conjunction with web-based or web-browsing software, self-contained application software (i.e., an app), or third-party software accessible through web-based or self-contained software.

Mobile application device 354 may operate in conjunction with other devices in order to provide the comprehensive flight planning tool. For example, mobile application device 354 may communicate with flight planning system 110 and one or more third-party devices 130 via network 140. In one example, mobile application device 354 may communicate with flight planning system 110 to initially install mobile application 450.

Mobile application 450 may include a plurality of modules configured to provide various functions to mobile application device 354. For example, mobile application 450 may include a data input module, a graphics module, and a flight planning communication module. Other modules may include an airports module, weather module, flight plan module, and the like. The modules may be implemented as hardware, software of a combination thereof.

In addition, the modules may operate in conjunction with the other components of mobile application device 354. For example, a data input module may receive information from interface hardware 430, a graphics module may display information via interface hardware 430, and a flight planning communication module may utilize a communication device to communicate with flight planning system 110.

Figure 5:
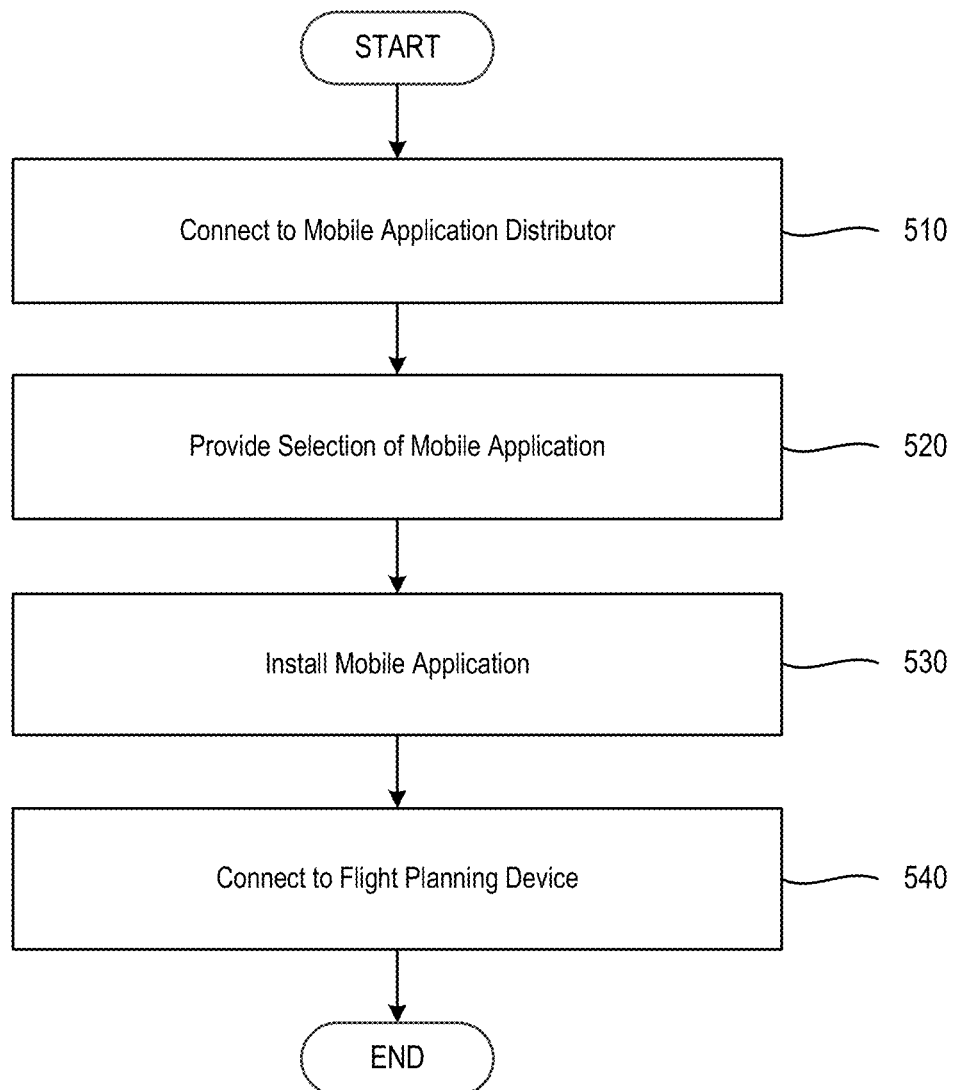
FIG. 5 is a flowchart of an exemplary mobile application installation process, consistent with disclosed embodiments.

FIG. 5 is a flowchart of an exemplary mobile application installation process 500. In one embodiment, mobile application device 354 may execute instructions via processing hardware 420 perform process 500 to install mobile application 450 on mobile application device 354. Process 500 may allow for mobile application 450 to be initially set up on mobile application device 354 such that the comprehensive flight planning tool may be readily available to a user of mobile application device 354.

Mobile application device 354 may connect to a third-party device 130 that is a mobile application distributor (step 510). For example, mobile application device 354 may execute instructions to connect to a mobile application "store" that allows for the selection of one or more mobile applications from a directory of available mobile applications for downloading to mobile application device 354. In some alternative embodiments, mobile application device 354 may connect to flight planning system 110 to download mobile application 450.

Mobile application device 354 may provide a selection of mobile application 450 to third-party device 130 (step 520). For example, mobile application device 354 may receive a selection via interface hardware 430 of a mobile application 450 that includes the comprehensive flight planning tool and transmit the selection to third-party device 130. If a fee is required to download mobile application 450, mobile application device 354 may provide payment information to third-party device 130.

Mobile application device 354 may receive mobile application data from third-party device 130 to use to install mobile application 450 (step 530). For example, mobile application 356 may receive installation data from third-party device 130 via network 140 and store the installation data in memory hardware 410. After installation is complete, an icon may be available via interface hardware 430 for a user to select mobile application 450.

Mobile application device 354 may execute mobile application 450 to connect to flight planning system 110 via flight plan API 318 (step 540). The connection to flight planning system 110 may allow mobile application device 354 to access the resources available from flight planning system 110. In some embodiments, mobile application device 354 may register a user with flight planning system 110. Additionally or alternatively, mobile application device 354 may allow a user to sign in to a pre-existing account that identifies the user and authorizes mobile application device 354 to access (via, e.g., flight plan API 318) flight planning system 110 when mobile application 450 is executed.

Through the above exemplary process 500, mobile application device 354 may connect to flight planning system 110 via execution of mobile application 450, such that a user may be provided with a comprehensive flight planning tool. Exemplary features of the mobile application and, thus, the comprehensive flight planning tool, are described in more detail below.

Figure 6:
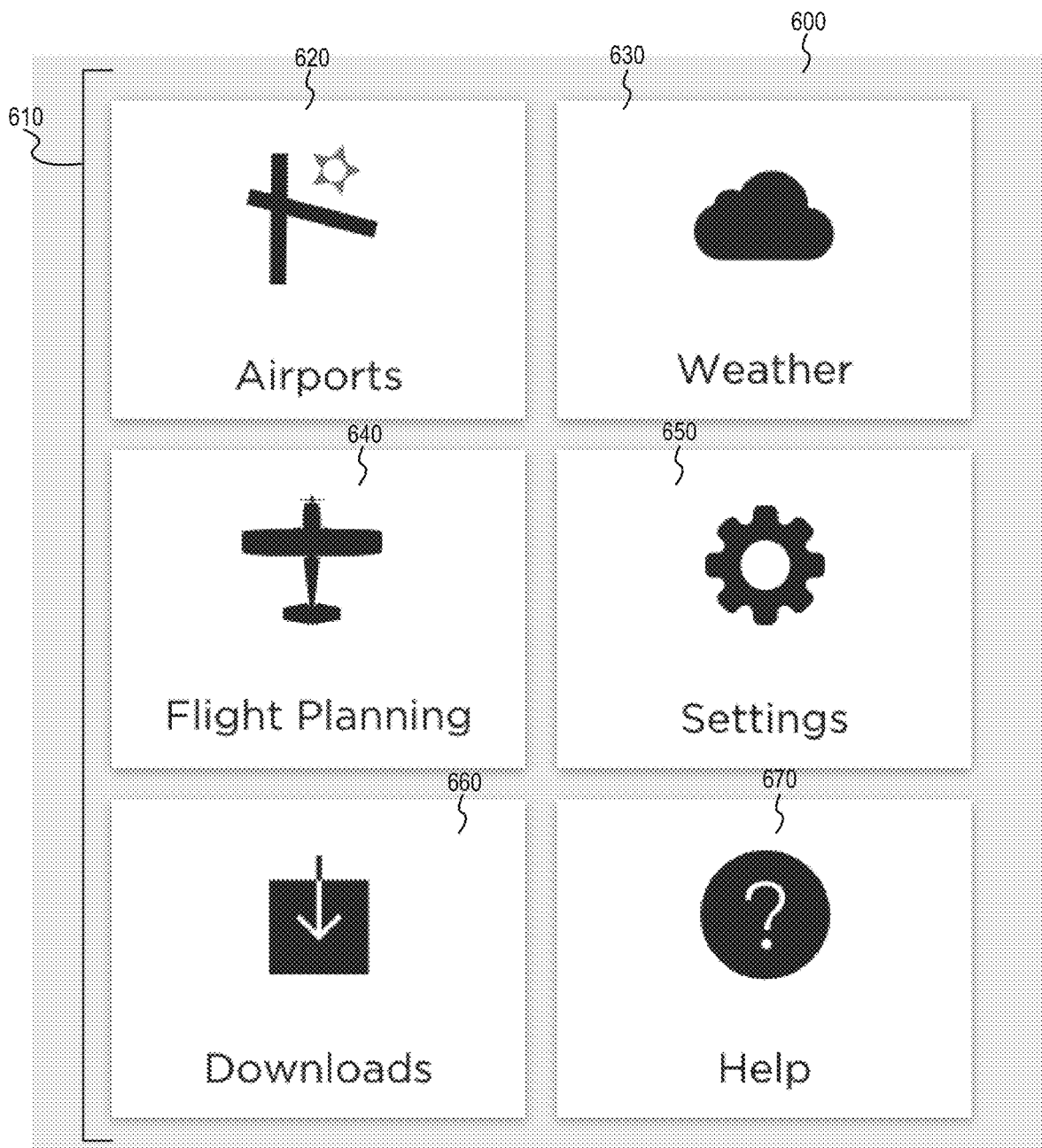
FIG. 6 is an illustration of an exemplary user interface including a menu of selectable tools, consistent with disclosed embodiments.

FIG. 6 is an exemplary user interface 600 that may be provided via interface hardware 430 of mobile application device 354. User interface 600 may be a menu of mobile application 450 that provides the user with a variety of options for tools 610 that may be useful in the preparation and/or execution of an aviation flight. These tools may include tools that are available online (e.g., available when mobile application device 354 is connected to flight planning system 110 or a third-party device 130) and tools that are available offline (e.g., available even if mobile application device 354 is not connected to another device).

User interface 600 includes one example of a possible selection of selectable tools 610 that may be available to the user via mobile application 450. It should be understood that more, less, and/or alternative tools 610 may be provided, and/or the tools 610 may be arranged in another configuration than the exemplary configuration shown.

As shown in FIG. 6, tools 610 may include an airports tool 620, a weather tool 630, a flight planning tool 640, a settings tool 650, a downloads tool 660, and a help tool 670. A user may operate mobile application device 354 to select a tool 610 (e.g., via interface hardware 430), which may cause mobile application device 354 to execute instructions to provide one or more features associated with the selected tool 610.

Figure 7:
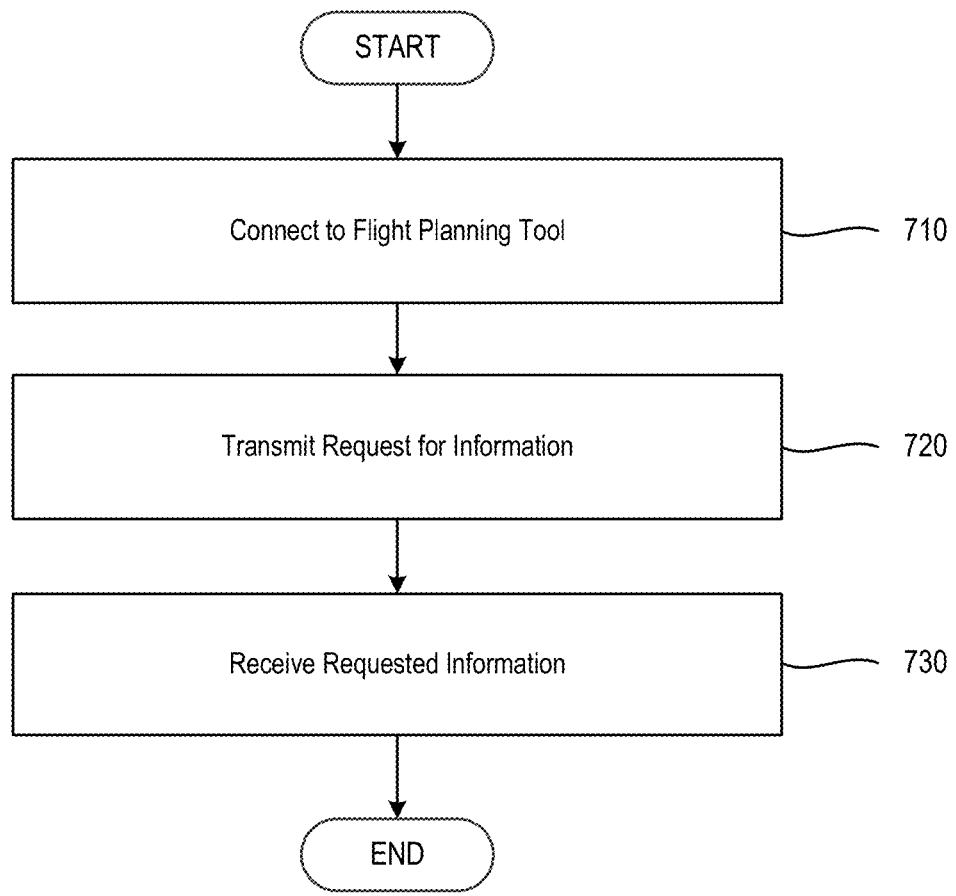
FIG. 7 is a flowchart of an exemplary online flight tool process, consistent with disclosed embodiments.

FIG. 7 is a flowchart of an exemplary online flight tool process 700, consistent with disclosed embodiments. In one embodiment, mobile application device 354 may execute instructions associated with mobile application 450 via processing hardware 420 to perform process 700 in order to provide a user with information that is not stored on mobile application device 354.

Mobile application device 354 may connect to flight planning system 110 via flight plan API 318 (step 710). For example, mobile application device 354 may receive, via interface hardware 430, identifying information (e.g., user account information) for use in authorizing a connection between mobile application device 354 and flight planning system 110. It should be understood that, in some instances, mobile application device 354 may additionally or alternatively connect to a third-party device 130 to receive online information in a similar manner.

Mobile application device 354 may transmit a request for information via flight plan API 318 (step 720). For example, mobile application device 354 may request airport information, weather information, flight planning information, and/or any other information that may be available from flight planning system 110. Flight planning system 110 may receive the request, locate the information requested, and access the information requested from one or more memory devices. In some embodiments, flight planning system 110 may communicate with a third-party device 130 (e.g., via flight plan API 318) to locate requested information (e.g., communicate with a weather provider to receive weather information).

Mobile application device 354 may receive the requested information from flight planning system 110 via flight plan API 318 (step 730). Mobile application device 354 may display the received information via interface hardware 430. Mobile application device 354 may receive additional input from a user and may further communicate with flight planning system 110 (and/or a third-party device 130) to request and receive additional information.

Through exemplary process 700, mobile application device 354, via mobile application 450, may provide a user with a variety of tools that are useful for the preparation and/or execution of an aviation flight. Examples of such tools include access to all information associated with any airport, aviation weather updates and weather images, the ability to create, modify, and file flight plans (e.g., with an official organization, such as the FAA), as well as provide access to information related to any other activities associated with a general aviation flight.

Figure 8:
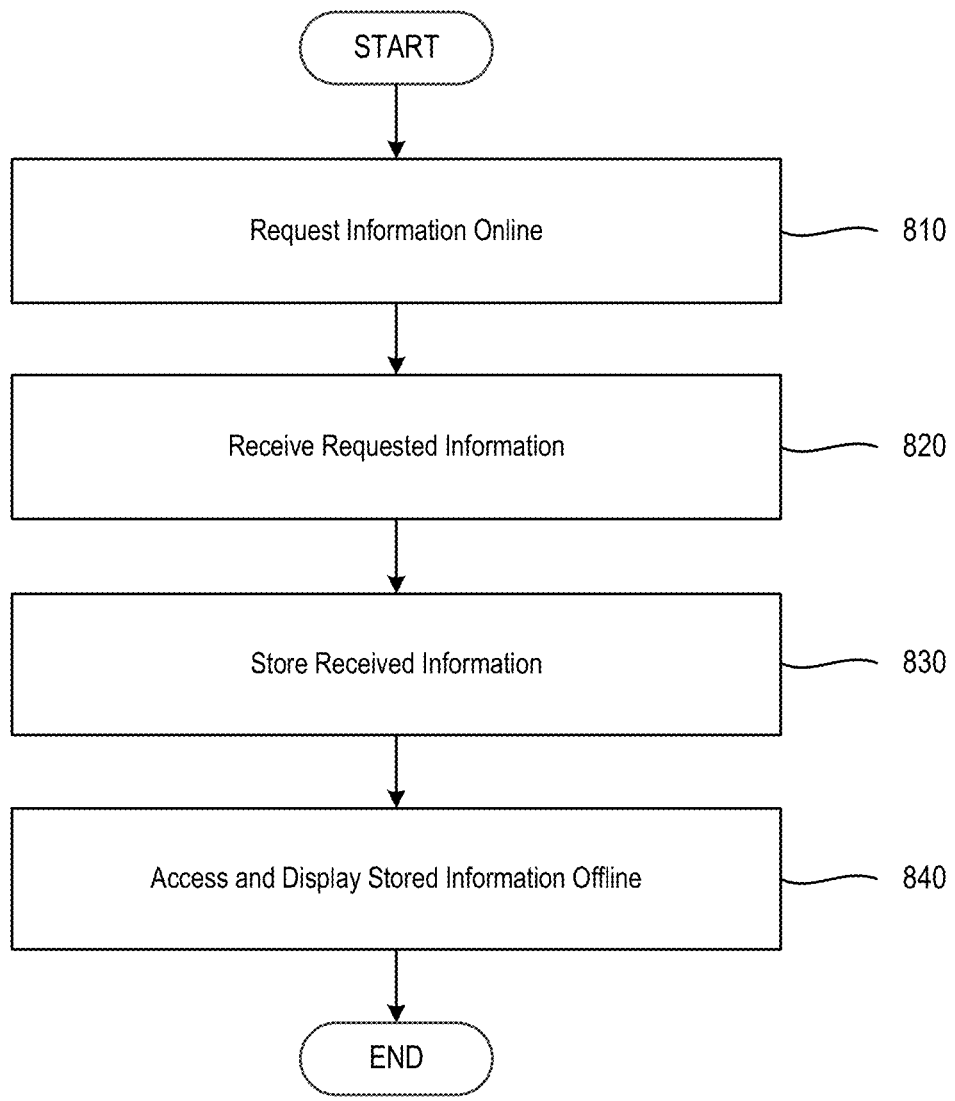
FIG. 8 is a flowchart of an exemplary offline flight tool process, consistent with disclosed embodiments.
Figure 9:
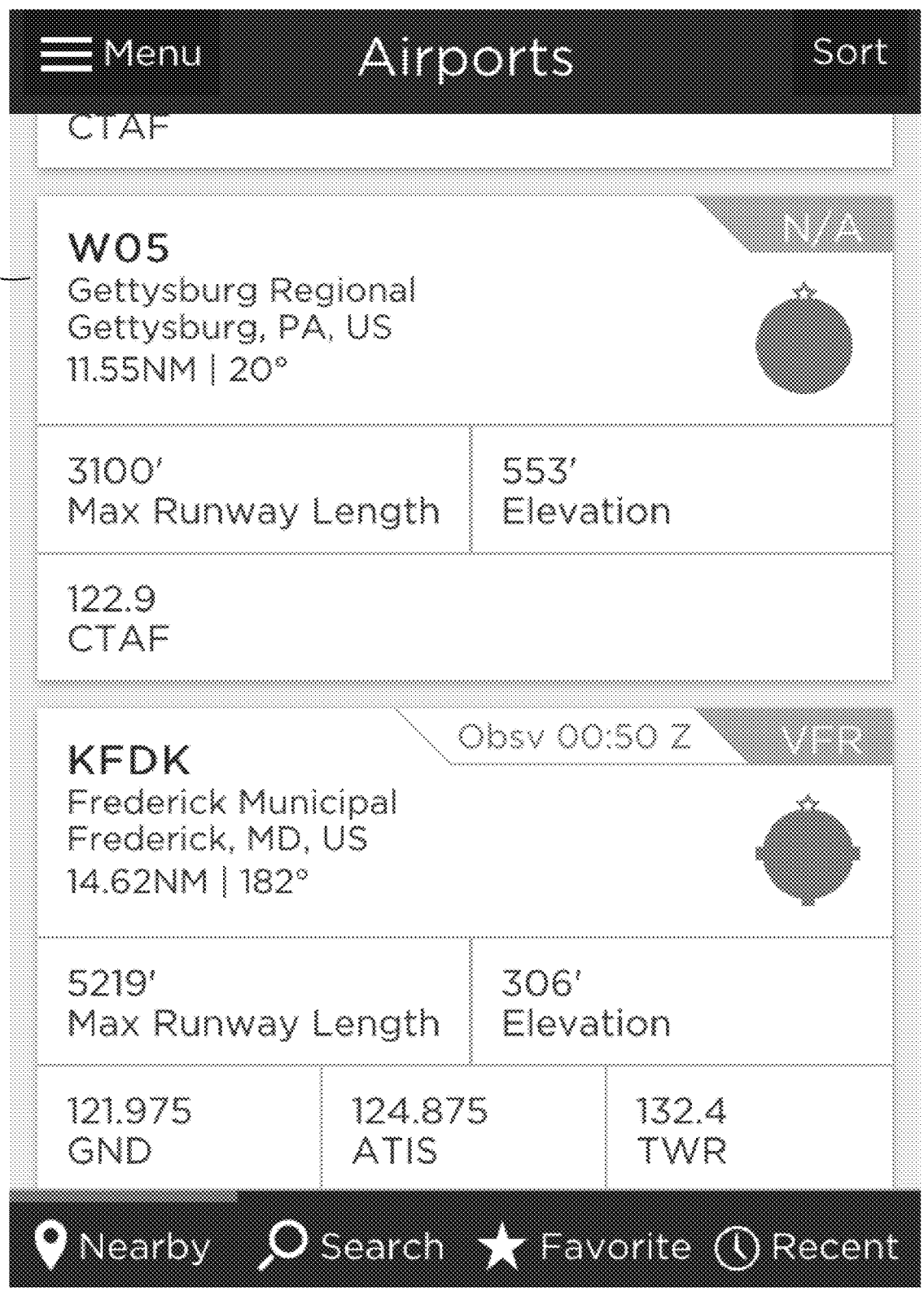
FIG. 9 is an illustration of an exemplary user interface including selectable tools, consistent with disclosed embodiments.
Figure 10:
FIG. 10 is an illustration of an exemplary user interface including selectable tools, consistent with disclosed embodiments.
Figure 12:
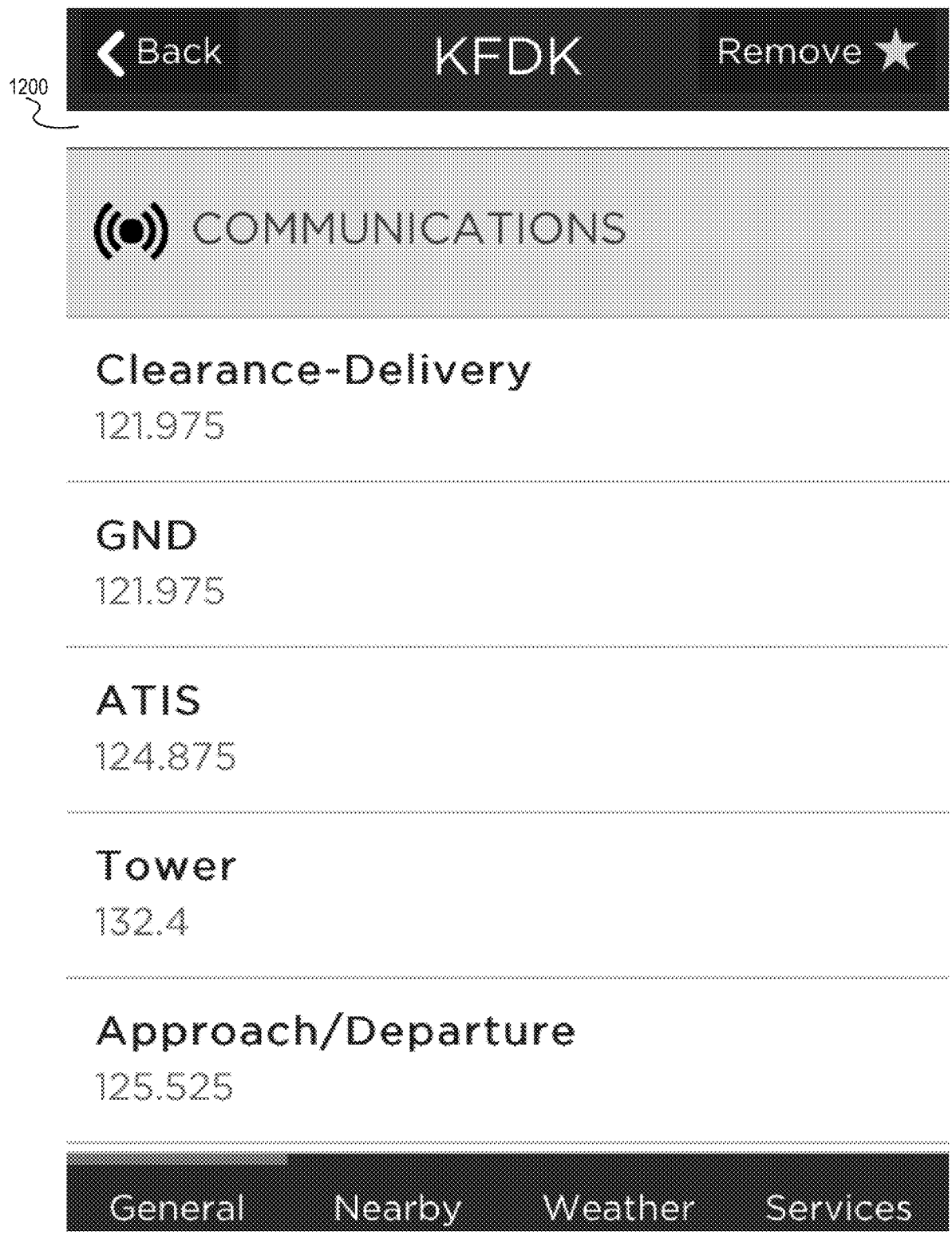
FIG. 12 is an illustration of an exemplary user interface including selectable tools, consistent with disclosed embodiments.
Figure 13:
FIG. 13 is an illustration of an exemplary user interface including selectable tools, consistent with disclosed embodiments.

FIG. 8 is a flowchart of an exemplary offline flight tool process 800, consistent with disclosed embodiments. In one embodiment, mobile application device 354 may execute instructions associated with mobile application 450 via processing hardware 820 to perform process 800 to provide a user with information that is available even when mobile application device 354 is offline (e.g., not connected and/or not able to be connected to flight planning system 110).

Mobile application device 354 may request information from flight planning system 110 and/or a third-party device 130 (step 810). For example, mobile application device 354 may request a download of airport information, weather information, runway information, etc., via flight plan API 318. Mobile application device 354 may receive the information responsive to the request from, e.g., flight planning system 110 via flight plan API 318 (step 820).

Mobile application device 354 may store the received information in memory hardware 410 (step 830). For example, mobile application device 354 may store received data associated with the information requested. In one example, mobile application device 354 may store an airport directory in memory hardware 410.

Mobile application device 354 may subsequently access stored information and display it via interface hardware 430 (step 840). For example, a user may request information associated with an airport, which may be recalled by mobile application device 354 from memory hardware 410. In this way, the information may be accessible to the user even when mobile application device 354 is not connected (or incapable of being connected) to flight planning system 110 (e.g., mobile application device 354 cannot connect to network 140).

Through exemplary disclosed processes 700 and 800, mobile application device 354 may provide a user with access to any flight planning information that may be useful in the preparation and/or execution of a general aviation flight. Further, the ability of mobile application device 354 to access all of this information via mobile application 450 connected to flight plan API 318 allows for a comprehensive source of information for a user at one location (e.g., client device 120). Further examples of the information and tools that may be available via mobile application 450, including the tools 610 shown in FIG. 6, are described in more detail below.

Further, it should be understood that the above processes may be used and repeated to navigate through mobile application 450 and use the tools 610. For example, mobile application device 354, via processing hardware 420, may continuously receive input from a user, provide input to flight plan API 318 (and/or an internal memory recall system), receive requested information, and display the information via interface hardware 430.

FIGS. 9-13 depict exemplary user interfaces (e.g., 900, 1000, 1100, 1200, and 1300) that further illustrate the various features that may be available via airports tool 620. In general, airports tool 620 may provide a user with access to a directory of airport information. The directory of airport information may include any information associated with an airport (and/or other similar location, such as a helipad, emergency runway, etc.) It should be understood that the features shown are exemplary and that other features may be provided.

User interface 900 includes an example of an airports list 910 that may include a list of selectable airports 920. The selectable airports 920 may correspond to actual airports for which information is available. While not shown, it should be understood that various search tools may be available to a user to find a particular airport, such as search bars, drop-down menus, etc., that allow a user to narrow a search to a particular area (e.g., airports within a state, near a city, etc.), name of airport, previously viewed airports, etc.

Each selectable airport 920 may include a preview of information associated with that airport. For example, airport location, airport code, max runway length, navigational aids, elevation, among other things, may be displayed to immediately provide some information to a user, perhaps aiding in selection of an airport for use in a flight and/or flight plan.

User interfaces 1000, 1100, 1200, and 1300 include information that may be displayed to a user after a selectable airport 920 has been selected. For example, user interface 1000-1300 may be various sections of a dedicated page associated with a selected airport 920. The dedicated page may include even more detailed information about the selected airport 920, such as an airport diagram (not shown), a runway diagram (user interface 1000), detailed airport characteristics (user interface 1100), communications information (user interface 1200), runway detail information (user interface 1300), among other information that may be useful (e.g., maps, navigation aids, weather information, etc.). In addition, various third-party resources may be made available, such as airport contact information, local business information (car rental locations, restaurants, etc.), and the like.

In some embodiments, airports tool 620 may be configured to provide customized information. For example, airports tool 620 may provide information based on a location of mobile application device 354. This information may include a list of airports that are nearby, distances to those airports, travel time to those airports, etc.

Airports tool 620 provides a user with a comprehensive and detailed directory of airport information that may be useful in planning a general aviation flight (e.g., determining which airports to use) and in executing a general aviation flight (e.g., using navigation aids, contacting the airport, finding an emergency runway, etc.). Further, the runway directory may be downloaded to the memory hardware 410 of mobile application device 354, thereby allowing the information to be accessible even if mobile application device 354 cannot connect to flight planning system 110.

The airport directory information may include, for example, airport procedures, airport diagram thumbnails and corresponding full-size diagrams (e.g., FAA airport diagrams), airport services, available fuel, and/or other information. Information generated by an airport (e.g., by its staff) or a governing body (e.g., FAA) pertaining to the airport may also be available in the airport directory information. For example, information, including comments, messages, bulletins, and/or other remarks, from airport staff or the FAA, runway obstruction notices, or temporary procedural changes may be posted the directory in connection with a particular airport.

Directory information may be viewed in one or more different formats via a user interface. For example, director information may be vied in full-page views, thumbnails, printable formats (e.g., kneeboard formats, full page, etc.), screen overlays, etc. Overlays may be positioned over other screens and include information relevant to the underlying screen. For example, an overlay over screen showing a travel route may include information indicative of, for example, fuel available along the route, airports along the route, airport services along the route, etc.

Directory and other information (e.g., flight plant info, NavLog info, etc.) useful for planning or carrying out flight plans may also be available for browsing, searching, downloading, printing, and sharing (e.g., via email, social media, etc.). For example database information and/or third-party source information may include resources, such as communication frequencies, waypoint information, fuel statistics, date and time information (e.g., time zone information, date conventions, etc.), Morse Code information, ground communication frequencies, and/or other information. Such information may be available to view electronically (e.g., via live feed, via download, etc.), for printing (e.g., full view, kneeboard format, etc.), or for sharing. It is noted that available information is not limited to types of information discussed above and may include other or additional types of information.

Such information may also include advertising information displayed via user interfaces or overlays. For example, advertisement interfaces may be displayed (e.g., based on a user selection of a certain interface view, based on a determination that a flight has ended, etc.) that are configured to redirect users to websites, apps, or other interfaces to view additional information.

Figure 15:
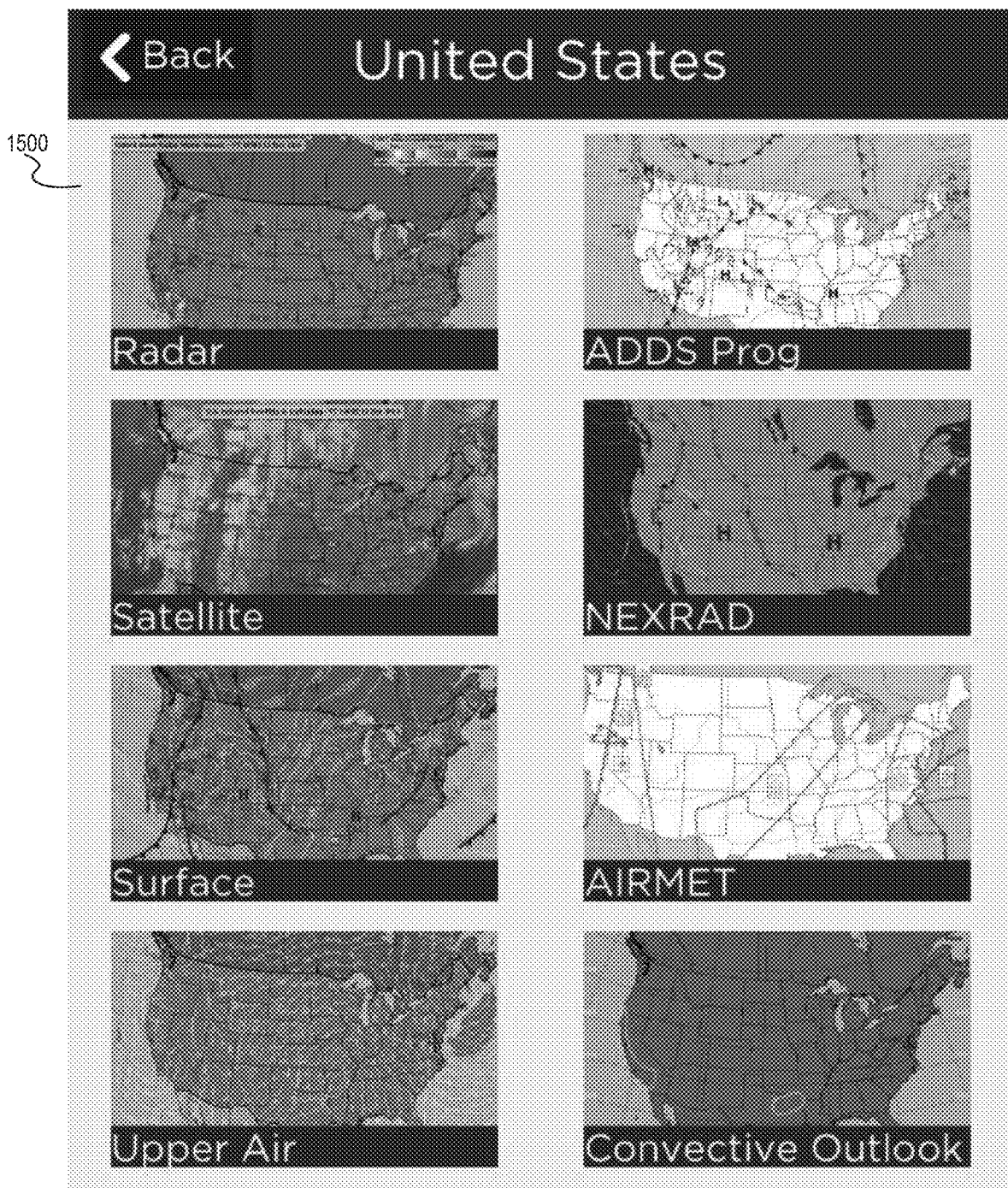
FIG. 15 is an illustration of an exemplary user interface including selectable tools, consistent with disclosed embodiments.
Figure 16:
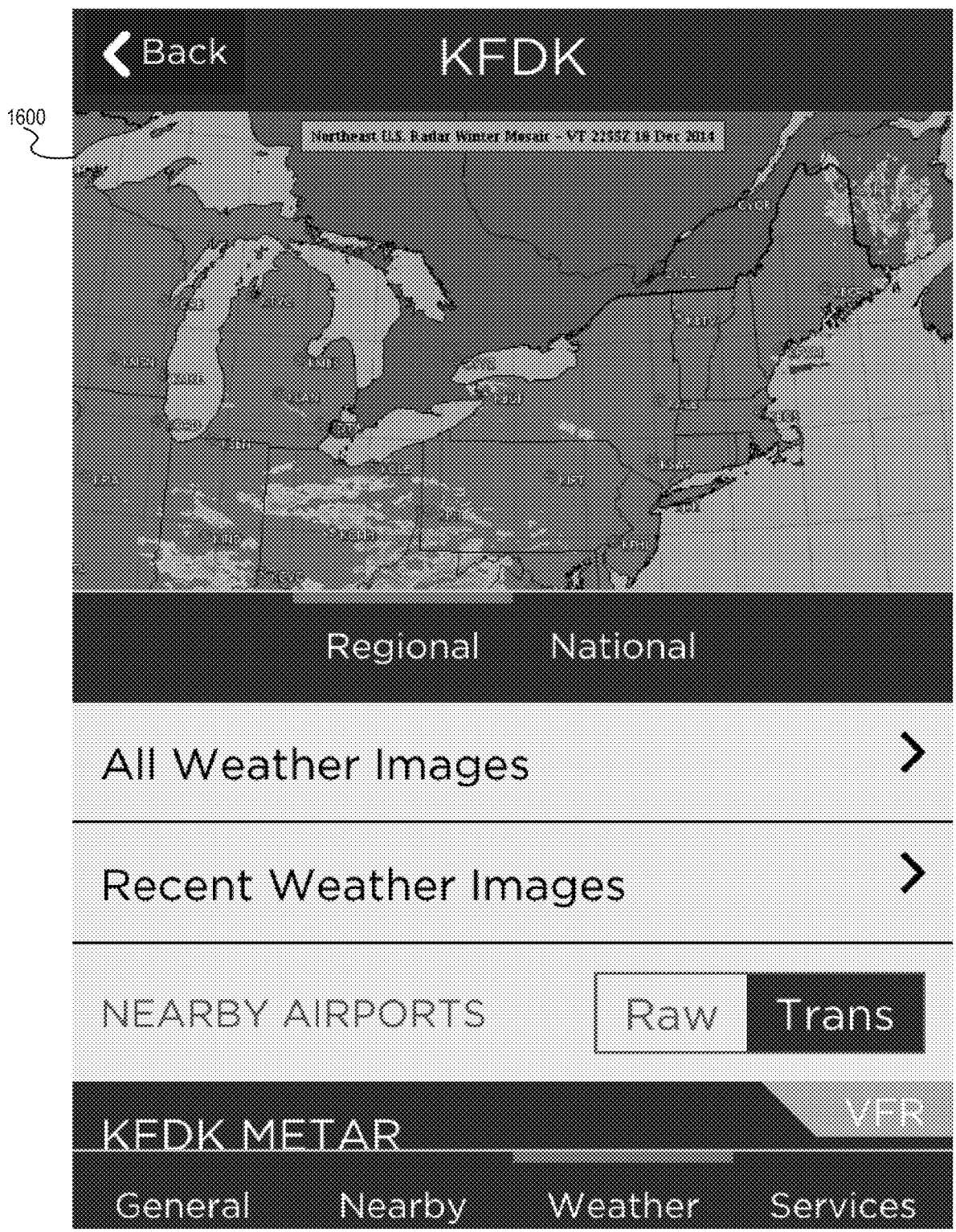
FIG. 16 is an illustration of an exemplary user interface including selectable tools, consistent with disclosed embodiments.

FIGS. 14-16 depict exemplary user interfaces (e.g., 1400, 1500, and 1600) that further illustrate the various features that may be available via weather tool 630. In general, weather tool 630 may provide a user with ready access to any weather information that may be useful in the preparation and/or execution of a flight plan. For example, weather tool 630 may provide a user with current weather and future weather forecasts, including precipitation, wind, pressure, cloud cover, temperatures, visibility, etc. This information may help a user determine a safe and/or effective time and/or path for a flight.

User interface 1400 includes an exemplary list of selectable locations for receiving weather information. For example, as shown, a region, country, etc., may be selected. Further user interfaces may provide more detailed location options, such as city, airport, etc. Other options for finding weather information associated with a specific location, such as a search bar for a user to input a location, may also be available via weather tool 620.

User interface 1500 includes an example of an array of types of weather maps that may be available for a selected location. The weather maps may be selectable via interface hardware 430. User interface 1600 includes an example of a selected weather map, which includes a larger version of the map and additional information.

In some embodiments, weather tool 630 may be configured to provide customized information. For example, weather tool 630 may provide information based on a location of mobile application device 354. This information may include nearby weather information (e.g., weather at nearby airports, nearby aviation conditions, etc.).

Weather tool 630 may provide a user with any and all desired weather information such that the user is apprised of important environmental conditions that may affect an upcoming or current flight. The information may include ground and weather information in local, regional, and national scope, depending on the user's desire. Mobile application device 354 may display the weather information in graphical and/or textual formats, as appropriate, and may be selected by a user or based on a location of mobile application device 354. Weather tool may also be configured to allow users to enter relevant weather information via user forms (e.g., dropdown menus, text bars, radio buttons, etc.) to quickly and easily generate and retrieve pilot weather reports (PIREP) and aircraft weather reports (AIREP).

As described herein, mobile application device 354 may communicate with flight planning system 110 to receive weather information and/or may connect to a third-party device 130 to receive the information (and/or supplemental information). Further, some weather information may be downloaded and stored in memory hardware 410 such that it is available to the user offline.

Figure 17:
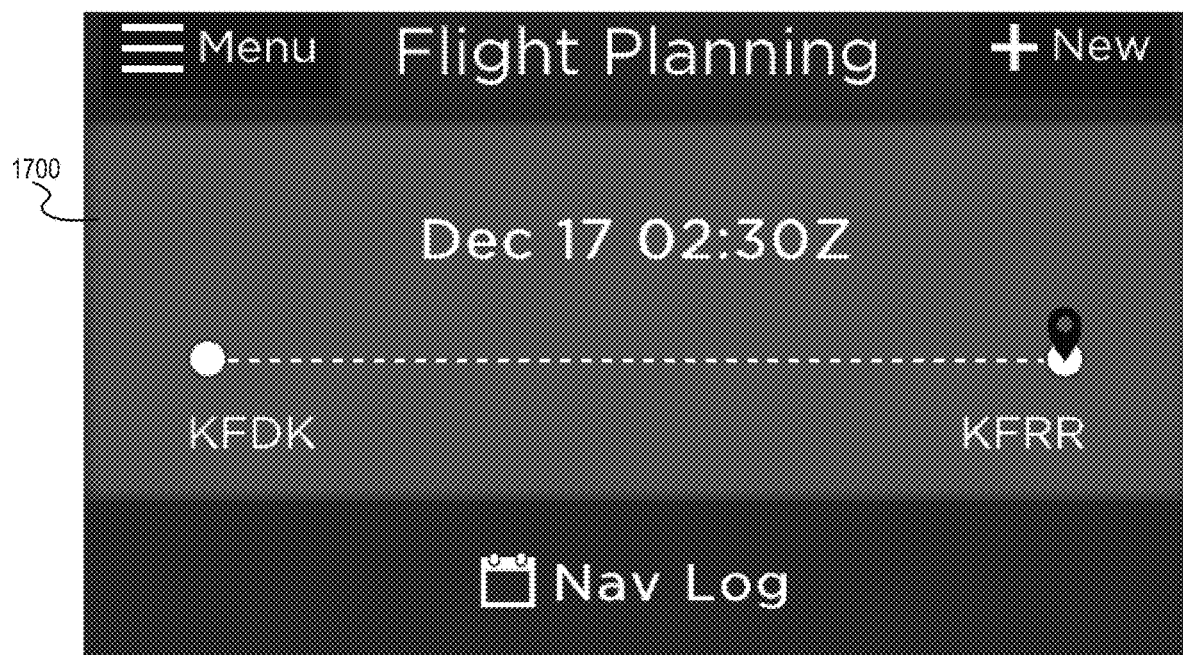
FIG. 17 is an illustration of an exemplary user interface including selectable tools, consistent with disclosed embodiments.
Figure 18:
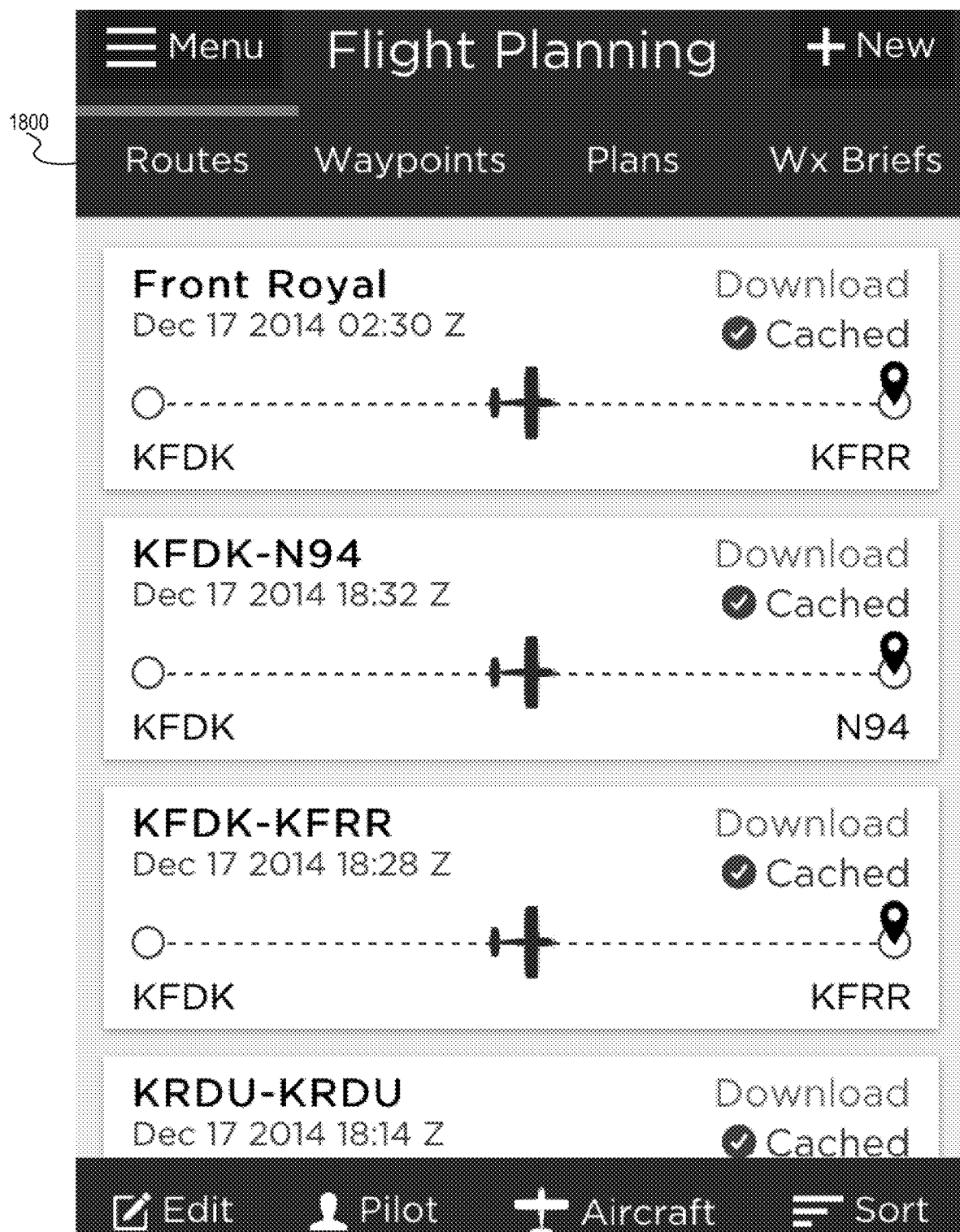
FIG. 18 is an illustration of an exemplary user interface including selectable tools, consistent with disclosed embodiments.

FIGS. 17-19 depict exemplary user interfaces (e.g., 1700, 1800, and 1900) that further illustrate the various features that may be available via flight planning tool 640. In general, flight planning tool 640 includes features that allow a user to plan a flight route and/or carry out the flight. For example, flight planning tool 640 may include features that allow a user to create a flight plan, modify a flight plan, recall a saved flight plan, file a flight plan with an official organization (e.g., the FAA), and the like.

User interface 1700 includes an exemplary created flight plan. The flight plan may include all information that may be useful to the user to allow the user to carry out the flight. The information may include, for example, origination location, destination location, flight plan type, distance, aircraft, aircraft color, etc. Navigation log information may also be stored as part of the flight plan. User interface 1800 includes an example of a list of flight plans (e.g., previous and/or upcoming flight plans) that may be recalled and used by a user. Each flight plan may be selected for storage on mobile application device 354 such that the information may be accessible offline.

User interface 1900 includes a resource for a flight plan to be filed with an official organization (or any desired destination), such as the FAA. This allows a user to properly and easily receive approval to execute a flight plan. The filing resource may include an option for the user to enter all pertinent information regarding the flight plan and an option to file the flight plan. The filing resource may allow users to file domestic/FAA or ICAO (International Civil Aviation Organization) flight plans. Mobile application device 354 may communicate with flight planning system 110 (e.g., via flight plan API 318) to file the flight plan, or mobile application device 354 may communicate directly with a third-party device 130.

Flight planning tool 640 may also be configured to allow users to request and retrieve other information from authorized filing agencies. For example, flight planning tool 640 may also be configured to allow users to enter weather briefing requests and retrieve them from the authorized agency (e.g., FAA).

Flight planning tool 640 may also provide flight tracking information. For example, mobile application device 354 may collect information during a flight and store the information in a log. Mobile application device 354 may communicate with another device, such as to automatically update a pilot's log.

Flight planning tool 640 may provide a user with an integrated tool that allows for creation of a flight plan using all available resources (airport information, weather information, etc.), modification of the flight plan, saving of the flight plan, and filing of the flight plan with an appropriate governmental agency or government designated provider (e.g., FAA), among other options, all in a single tool of mobile application 450. As another feature, flight planning tool 640 may include a flight plan sharing tool. For example, flight planning system 110 may save user-created flight plans to a database and make the database accessible to users of mobile application 450. Other features may include stored pilot profiles, aircraft profiles, weather information, etc.

Settings tool 650 may allow a user to select certain user preferences to customize the experience of using mobile application 450. For example, settings tool 650 may allow a user to select which types of airports are shown (e.g., whether to include private airports, helipads, etc.), weather preferences, preferred fuel type, and account information, among other options.

Downloads tool 660 may provide access options for mobile application device 354 to download information that may be used offline. For example, downloads tool 660 may provide an option for mobile application device 354 to download an airports directory, a runway diagrams database, etc. Downloads tool 660 may also provide information regarding whether mobile application device 354 has downloaded the most recent version of certain information.

Help tool 670 may provide technical information that may assist a user in using mobile application 450. For example, help tool 670 may include contact information for a provider associated with mobile application 450, frequently asked questions, etc.

While tools 610 have been described as separate tools, it should be understood that one or more tools 610 and/or various features thereof may be integrated to provide a more comprehensive experience as each tool 610 is used. For example, information associated with an airport selected using airports tool 620 may include weather information from weather tool 630. In another example, a flight plan accessed through flight planning tool 640 may include airport information from airports tool 620. Preferences from settings tool 650 may be integrated with one or more other tools 610 to provide the preferences. Thus, it should be understood that the configuration of tools 610 is exemplary and could take other forms to provide the same tools and information.

Further, other tools may be provided within tools 610 and/or as separate tools for the user. For example, a fueling tool may provide location, availability, and pricing of aviation fuel. The fueling tool may provide fuel information relating to available fuel in certain areas (e.g., at a plurality of airports, airport-affiliated suppliers, third-party suppliers, etc.) and include information posted by other users relating to fuel prices at certain location. Fuel the fuel tool may include information on various types of fuel available at particular locations, such as 100-LL (avgas), Jet A, MoGas (automotive grade), and others. The fuel tool may also include search functionality to allow users to quickly find the location of desired fuel. For example, the fuel tool may include user forms, such as dropdown menus, radio buttons, and text bars, which allow the user to search and/or filter information by fuel type, price (e.g., maximum, minimum, range, etc.), distance (e.g., from a current location, along a route, from a destination, etc.), vendor type (e.g., public, private, etc.), or other information.

A social integration tool may allow a user to share information from mobile application 450 with others through a social media platform. For example, photos, locations, attractions, services, flight plans, etc. may be shared to social media through mobile application 450. Similarly, mobile application 450, through communication with flight planning system 110, may allow sharing of user-submitted content such as photos, comments, fuel prices, flight plans, etc. Other information received and/or stored by flight planning system 110 may also be shared with users of mobile application devices 354, such as pilot information, aircraft information, custom waypoints, flight plans, temporary flight restrictions, emergency notifications, etc.

Other tools provided by mobile application 450 may include template and customizable pilot and aircraft checklists, weight and balance calculators and resources, safety of flight calculators, calendar and reminders, pilot events and activities, etc.

For example, mobile application 450 may be configured to allow users to print or fill out existing or downloadable checklist forms on user interfaces. In this way, users may be allowed to easily check off pre-flight, in-flight, and post-flight checklist items. Mobile application 450 may allow users to access a library of common checklists for common aircrafts (e.g., stored in conjunction with third-party device 130, user database 340, memory hardware 410, or other media storage) that may be viewed or downloaded via mobile application device 354. Mobile application 450 may also allow users to modify existing checklists, create new checklists from available templates, or create new checklists from scratch in via one or more user interfaces in conjunction with interface hardware 430.

In another aspect, mobile application may be configured to allow users to monitor aircraft loading with respect to passenger and cargo loads. For example, signals generated by sensors (e.g., contact/pressure sensors, optical sensors, infrared sensors, barcode sensors, laser sensors, etc.) associated with passenger seats, cargo compartments, and/or other aircraft structural components may be received from third-party devices 130 and translated into loading data. Such data may include weight values, qualitative indicia (e.g., colors, shapes, textures, etc.), and or other visual indicator that may be displayed via interface hardware 430. The data may be communicable in conjunction with a library known aircraft geometries and capacities. In this way, the user may be able to quickly identify opportunities to optimize weight distribution and confirm that loading values are within ranges, for example, as provided by an aircraft pilot's operating handbook (POH).

In another aspect, third-party device 130 may be a schedule organizer and may receive flight plan and other information to update a calendar. The calendar may include events associated with, for example, airports (e.g., scheduled closures, social events, fuel deliveries, etc.), aircrafts (e.g., scheduled maintenance, recurring flights, etc.), and/or associated personnel. In one aspect, the calendar may also include information that may be used to plan a full trip, such as hotel reservations, local attractions, entertainment, points of interest, and/or other information. Such information may be displayed on a calendar in a user interface, and the information may be displayed in coordination with received flight plant information (e.g., current location, destination location, current/future date and time, etc.). Other content from other third-party sources may be included, as desired.

Calendar information may be used to generate reminders. For example, a reminder may be created regarding a scheduled event at a desired time prior to the event. The reminder may be configured as a push notification or other type of visible reminder on client device 120. In this way, pertinent information may be brought to the user's attention as the events become relevant based on time, location, and/or other ascertainable variables.

In another aspect, third-party device 130 may be a social media platform configured to receive information from flight planning system 110 and/or client device 120, such as flight plans, pictures, schedules, locations, events, etc. Certain information may be automatically or conditionally submitted in the second request to the flight planning entity via the flight planning system based on the user inputs (e.g., based on a user permission or preference, based on a category of information, etc.) sent to social media platforms, such as calendar events, notices of flight arrivals and/or departures (e.g., including time, date, location, etc.), flight plan details, and/or other information.

The above-described mobile application 450 provides a user with a comprehensive flight planning tool that allows for a user to easily access any and all information necessary for the planning and/or execution of an aviation flight. Mobile application 450 may work in conjunction with other software and/or hardware systems (e.g., websites) that provide access to the same resources (e.g., pilot profile information, aircraft profile information, flight plans, etc.) to provide real-time access to information from multiple locations (e.g., mobile and website). Further, connection to flight plan API 318 allows mobile application device 354 to communicate with appropriate third-party devices 130 to further receive information (e.g., weather) and send information (e.g., file flight plans). In addition, the ability to store information locally in memory hardware allows the information to be accessed offline, for instance when no network connection is available. When a network connection is available, the mobile application provides custom information, such as airport information, weather information, etc., based on a location of mobile application device 354.

The exemplary disclosed embodiments allow for the accumulation and availability of all information that may be useful in aviation, such as flight planning or flying. The configuration and components (e.g., mobile application 450, flight plan API 318) of the disclosed embodiments allow this information to be provided to and used by a user, through a mobile application on a mobile device. The mobile application includes a variety of tools that combine to provide a comprehensive flight planning tool that is readily available to and easily accessed by a user.

Computer programs created on the basis of the written description and methods of this specification are within the skill of a software developer. The various programs or program modules can be created using a variety of programming techniques. For example, program sections or program modules can be designed in or by means of Java, Objective C, C++, Java script, assembly language, or any such programming languages, including third-party libraries. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A client device for communicating with a flight planning system, comprising:
 a computing system configured to execute software instructions, the computing system including:
  a memory device storing software instructions;
  a processor configured to execute the software instructions stored in the memory device to communicate with the flight planning system;
 a flight planning application stored in the memory device, wherein the processor is configured to execute the flight planning application to access the flight planning system via a flight planning application program interface (API),
  wherein accessing the flight planning system includes identifying a user and authorizing access to the flight planning system via the flight planning API when the flight planning application is executed;
 a display device comprising interface hardware configured to display interface screens generated by the flight planning application;
 wherein, when executed, the flight planning application is configured to:
  access a server of the flight planning system, the server including a plurality of modules comprising a flight planning module, a weather module, and an airport module;
  communicate, via the API, a request for information based on a selection of one of a plurality of tools corresponding to one of the plurality of modules, the selection received via the interface hardware;
  receive, from the flight planning system via the API, an aviation flight plan generated using responsive information that fulfills the request, wherein the responsive information was generated by the flight planning system based on information from a third-party device; and
  display the aviation flight plan via the interface hardware.

2. The client device of claim 1, wherein the client device is a mobile application device.

3. The client device of claim 2, wherein the mobile application device is a smartphone, a tablet, or a laptop computer.

4. The client device of claim 1, wherein the client device is a desktop computer, a server, an embedded system, or a dedicated hardware device.

5. The client device of claim 1, wherein the flight planning application is a self-contained application stored on the client device.

6. The client device of claim 1, wherein the flight planning application is configured to be used in conjunction with web-browsing software.

7. The client device of claim 1, wherein the flight planning application is configured to be used in conjunction with third-party software accessible through web-based or self-contained software.

8. The client device of claim 1, wherein the flight planning application includes a data input module, a graphics module, or a flight planning communication module.

9. The client device of claim 8, wherein the data input module is configured to receive information from the interface hardware, the graphics module is configured to display information via the interface hardware, and the flight planning communication module is configured to utilize a communication device to communicate with the flight planning system.

10. The client device of claim 1, wherein processor configured to execute the software instructions stored in the memory device to access a mobile application distributor and allow download of the flight planning application to the client device.

11. A method of using a client device for communicating with a flight planning system, comprising:
 executing software instructions via a computing system of the client device that includes:
  a memory device storing software instructions;
  a processor configured to execute the software instructions stored in the memory device to communicate with the flight planning system;
 storing a flight planning application in the memory device;
 executing the flight planning application using the processor to access the flight planning system via a flight planning application program interface (API),
 accessing the flight planning system by identifying a user and authorizing access to the flight planning system via the flight planning API when the flight planning application is executed;
 executing the flight planning application d to:
  access a server of the flight planning system, the server including a plurality of modules comprising a flight planning module, a weather module, and an airport module;

communicate, via the API, a request for information based on a selection of one of a plurality of tools corresponding to one of the plurality of modules, the selection received via the interface hardware;

receive, from the flight planning system via the API, an aviation flight plan generated using responsive information that fulfills the request, wherein the responsive information was generated by the flight planning system based on information from a third-party device; and display the aviation flight plan via interface hardware of a display device.

12. The method of claim 11, wherein the client device is a mobile application device.

13. The method of claim 12, wherein the mobile application device is a smartphone, a tablet, or a laptop computer.

14. The method of claim 11, wherein the client device is a desktop computer, a server, an embedded system, or a dedicated hardware device.

15. The method of claim 11, wherein the flight planning application is a self-contained application stored on the client device.

16. The method of claim 11, further comprising using the flight planning application in conjunction with web-browsing software.

17. The method of claim 11, further including using the flight planning application in conjunction with third-party software accessible through web-based or self-contained software.

18. The method of claim 11, wherein the flight planning application includes a data input module, a graphics module, or a flight planning communication module.

19. The method of claim 18, further comprising at least one of:

receiving information from the interface hardware via the input module;

displaying information via the graphics module to display information using the interface hardware; or utilizing a communication device to communicate with the flight planning system via the flight planning communication module.

20. The method of claim 11, further comprising executing the software instructions stored in the memory device via the processor to access a mobile application distributor and allow download of the flight planning application to the client device.

* * * * *

UNITED STATES PATENT AND TRADEMARK OFFICE
CERTIFICATE OF CORRECTION

PATENT NO. : 10,971,021 B2
APPLICATION NO. : 16/918451
DATED : April 6, 2021
INVENTOR(S) : Douglas Nolen Shorter, Jr. et al.

It is certified that error appears in the above-identified patent and that said Letters Patent is hereby corrected as shown below:

In the Claims

Claim 10, Column 20, Line 42, "wherein processor" should read --wherein the processor is--

Claim 11, Column 20, Line 50, "storing software instructions;" should read --storing software instructions; and--

Claim 11, Column 20, Line 58, "application program interface (API)," should read --application program interface (API);--

Claim 11, Column 20, Lines 61-62, "when the flight planning application is executed;" should read --when the flight planning application is executed; and--

Claim 11, Column 20, Line 63, "executing the flight planning application d to" should read --executing the flight planning application to--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*